United States Patent
Clapp-Davis et al.

(10) Patent No.: US 12,185,728 B2
(45) Date of Patent: Jan. 7, 2025

(54) ADJUSTABLE ROLLING PIN SYSTEM

(71) Applicant: Joel Clapp-Davis, Los Angeles, CA (US)

(72) Inventors: Joel Clapp-Davis, Los Angeles, CA (US); Jace Dispenza, Los Angeles, CA (US); Jonathan Mintzer, Los Angeles, CA (US)

(73) Assignee: Joel Clapp-Davis, Los Angeles, CA (US)

( * ) Notice: Subject to any disclaimer, the term of this patent is extended or adjusted under 35 U.S.C. 154(b) by 0 days.

(21) Appl. No.: 17/824,598

(22) Filed: May 25, 2022

(65) Prior Publication Data
US 2023/0380429 A1 Nov. 30, 2023

(51) Int. Cl.
A21C 3/02 (2006.01)
(52) U.S. Cl.
CPC ................... A21C 3/021 (2013.01)
(58) Field of Classification Search
CPC ............................................ A21C 3/021
USPC ............................................ 492/14
See application file for complete search history.

(56) References Cited

U.S. PATENT DOCUMENTS

| | | | | |
|---|---|---|---|---|
| 353,177 A * | 11/1886 | Taylor | ................ | A21C 3/021 492/14 |
| 857,308 A * | 6/1907 | Stanford | ................ | A21C 3/021 215/396 |
| 4,045,850 A * | 9/1977 | Brandes | ................ | A21C 3/021 492/14 |
| 4,435,145 A * | 3/1984 | Abrams | ................ | A21C 3/021 425/374 |
| 7,033,309 B1 * | 4/2006 | Davis | ................ | A21C 3/021 492/14 |

FOREIGN PATENT DOCUMENTS

| | | | | |
|---|---|---|---|---|
| DE | 601994 C | * | 8/1934 | ............. A21C 3/021 |
| GB | 2350545 A | * | 12/2000 | ............. A21C 3/021 |

OTHER PUBLICATIONS

English Machine Translation of DE601994C (Year: 1934).*

* cited by examiner

Primary Examiner — Sarang Afzali
(74) Attorney, Agent, or Firm — Ahmann Kloke LLP

(57) ABSTRACT

A rolling pin system comprising a rolling pin with two ends and a rolling pin diameter, radial expansion device coupled to each end, each radial expansion device including multiple arms, each arm including a pivot component to pivot between two states, each arm including arc sections, each arc section having a diameter of curvatures, in one state, the arc section of the multiple arms cooperating to form a surface of rotation with one diameter of curvature, in the second state, the arc section of the multiple arms cooperating to form a surface of rotation with another diameter of curvature, the other diameter of curvature being greater than the one diameter of curvature.

14 Claims, 30 Drawing Sheets

ADJUSTABLE ROLLING PIN SYSTEM

FIELD OF THE INVENTION

Embodiments described herein generally relate to an adjustable rolling pin.

BACKGROUND

Rolling pins are an important tool found in many kitchens. Rolling pins are cylindrical in shape, providing a surface on which to form and flatten dough to an even thickness prior to cooking or baking. Rolling pins may be composed of many different types of materials, including wood, ceramic, marble, porcelain, glass, brass, and copper.

Rolling dough to the desired thickness includes placing the cylindrical body of the rolling pin at the center of the dough and hand rolling the rolling pin along a radius from the center of the dough while applying steady downward pressure on the outer edges of the body or handles of the rolling pin. Because the dough thickness varies with the downward pressure that is applied to the rolling pin and the speed with which the rolling pin traverses across the dough, it is difficult to achieve a uniform and designated dough thickness. Expert bakers may be able to achieve dough with uniform thickness using a common rolling pin as a result of years of practice.

Bakers may alternatively rely on offset discs to achieve a uniform designated dough thickness. An offset disc attached to each end of the rolling pin enables the rolling pin to evenly roll the dough to provide a uniform designated thickness. The offset discs must be paired in size and affixed to both ends of the rolling pin in order to achieve a designated dough thickness. Changing the dough thickness relies on removing the offset disks and then replacing the offset disks with a matched pair of offset disks having a different size. Because the offset discs are separate parts to the rolling pin, they may be misplaced in the baking setting. There is a need for a rolling pin that provides for adjustments in uniform dough thickness without the complexities associated with storing, installing and re-installing the offset disks.

SUMMARY

An example of a rolling pin comprising a rolling pin with a first end, a second end, and a rolling pin diameter, a first radial expansion device coupled to the first end, the first radial expansion device having a first modifiable diameter, the first radial expansion device having a plurality of first arms, each first arm of the plurality of first arms including a first pivot component configured to pivot from a first state to a second state, each first arm including a first arc section and a second arc section, the first arc section having a first diameter of curvature, the second arc section having a second diameter of curvature different than the first diameter of curvature, the first arc sections of the plurality of first arms cooperating to form a first surface of rotation when the first pivot components of the plurality of first arms are in the first state, the second arc sections of the plurality of first arms cooperating to form a second surface of rotation when the first pivot components of the plurality of first arms are in the second state, the second diameter of curvature being greater than the rolling pin diameter, and a second radial expansion device coupled to the second end, the second radial expansion device having a second modifiable diameter, the second radial expansion device having a plurality of second arms, each second arm of the plurality of second arms including a second pivot component configured to pivot from a third state to a fourth state, each second arm including a third arc section and a fourth arc section, the third arc section having the first diameter of curvature, the fourth arc section having the second diameter of curvature, the third arc sections of the plurality of second arms cooperating to form the first surface of rotation when the second pivot components of the plurality of second arms are in the third state, the fourth arc sections of the plurality of second arms cooperating to form the second surface of rotation when the second pivot components of the plurality of second arms are in the fourth state.

In various embodiments, each first pivot component of the plurality of first arms is coupled to a first actuation device configured to pivot from the first state to the second state, and each second pivot component of the plurality of second arms is coupled to a second actuation device configured to pivot from the third state to the fourth state.

In some embodiments, each first arm of the plurality of first arms is at least partially adjacent to at least one other arm of the plurality of first arms, and each second arm of the plurality of second arms is at least partially adjacent to at least one other arm of the plurality of second arms. In one example, the first surface of rotation is a circular spiral of the first arc sections of the plurality of first arms. In one embodiment, the second surface of rotation is a circular spiral of the second arc sections of the plurality of first arms. The first state comprises the first arc sections of the plurality of first arms being at a first outer circumference of the first radial expansion device and wherein the second state comprises the second arc sections of the plurality of first arms being at a second outer circumference of the first radial expansion device. In some embodiments, each first pivot component is capable of pivoting about a radial center of the first radial expansion device at a pivoting diameter.

The rolling pin may further comprise an elastic material that is stretchable when the second arc sections of the plurality of first arms cooperate to form the second surface of rotation. The first diameter of curvature is greater than the rolling pin diameter. The rolling pin may further comprise a rolling member coupled to the first radial expansion device opposite the rolling pin.

An example rolling pin system comprises a rolling pin with a first end, a second end, and a rolling pin diameter, a first radial expansion device coupled to the first end, the first radial expansion device having a first modifiable diameter, the first radial expansion device having a plurality of first arms, each first arm of the plurality of first arms including a first extension means configured to extend the first arm of the plurality of first arms from a first state to a second state, each first arm including a first arc section and a second arc section, the first arc section having a first diameter of curvature, the second arc section having a second diameter of curvature different than the first diameter of curvature, the first arc sections of the plurality of first arms cooperating to form a first surface of rotation when the first extension means of the plurality of first arms are in the first state, the second arc sections of the plurality of first arms cooperating to form a second surface of rotation when the first extension means of the plurality of first arms are in the second state, the second diameter of curvature being greater than the rolling pin diameter, and a second radial expansion device coupled to the second end, the second radial expansion device having a second modifiable diameter, the second radial expansion device having a plurality of second arms, each second arm of the plurality of second arms including a second extension means configured to extend the second arm of the plurality of second arms from a third state to a fourth state, each second arm including a third arc section and a fourth arc section, the third arc section having the first diameter of curvature, the fourth arc section having the second diameter of curvature, the third arc sections of the plurality of second arms cooperating to form the first surface of rotation when the second extension means of the plurality of second arms are in the third state, the fourth arc sections of the plurality of second arms cooperating to form the second surface of rotation when the second extension means of the plurality of second arms are in the fourth state.

In some embodiments, each first extension means of the plurality of first arms is coupled to a first actuation device configured to extend the first arm of the plurality of first arms from the first state to the second state, and each second extension means of the plurality of second arms is coupled to a second actuation device configured to extend the first arm of the plurality of first arms from the third state to the fourth state. In one example, each first arm of the plurality of first arms is at least partially adjacent to at least one other arm of the plurality of first arms, and each second arm of the plurality of second arms is at least partially adjacent to at least one other arm of the plurality of second arms. The first surface of rotation is a circular spiral of the first arc sections of the plurality of first arms. The second surface of rotation is a circular spiral of the second arc sections of the plurality of first arms. The first state comprises the first arc sections of the plurality of first arms being at a first outer circumference of the first radial expansion device and wherein the second state comprises the second arc sections of the plurality of first arms being at a second outer circumference of the first radial expansion device. Each first pivot component is at a pivoting diameter about a radial center of the first radial expansion device.

In various embodiments, the rolling pin further comprises an elastic material that is stretchable when the second arc sections of the plurality of first arms cooperate to form the second surface of rotation. The first diameter of curvature is greater than the rolling pin diameter.

An example method comprises providing rolling pin with a first end, a second end, and a rolling pin diameter, coupling a first radial expansion device to the first end of the rolling pin, the first radial expansion device having a first modifiable diameter, the first radial expansion device having a plurality of first arms, each first arm of the plurality of first arms including a first pivot component configured to pivot from a first state to a second state, each first arm including a first arc section and a second arc section, the first arc section having a first diameter of curvature, the second arc section having a second diameter of curvature different than the first diameter of curvature, the first arc sections of the plurality of first arms cooperating to form a first surface of rotation when the first pivot components of the plurality of first arms are in the first state, the second arc sections of the plurality of first arms cooperating to form a second surface of rotation when the first pivot components of the plurality of first arms are in the second state, the second diameter of curvature being greater than the rolling pin diameter, and coupling a second radial expansion device to the second end of the rolling pin, the second radial expansion device having a second modifiable diameter, the second radial expansion device having a plurality of second arms, each second arm of the plurality of second arms including a second pivot component configured to pivot from a third state to a fourth state, each second arm including a third arc section and a fourth arc section, the third arc section having the first diameter of curvature, the fourth arc section having the second diameter of curvature, the third arc sections of the plurality of second arms cooperating to form the first surface of rotation when the second pivot components of the plurality of second arms are in the third state, the fourth arc sections of the plurality of second arms cooperating to form the second surface of rotation when the second pivot components of the plurality of second arms are in the fourth state.

DETAILED DESCRIPTION

Various embodiments enable an individual to dynamically change radial expansion devices (e.g., expandable gears) incorporated within a rolling pin to assist in rolling or flattening dough to achieve a uniform thickness. In one example, the rolling pin system includes a rolling pin body, and a radial expansion device on each end of the body of the rolling pin.

In various embodiments, the radial expansion devices at or near each end of the rolling pin is controllable by a user to set different offsets. The different offsets allow the user to roll out dough or other material to a desired thickness.

The radial expansion device include controllable arms that may be expanded to a variety of different radii. In one example, a user may adjust the radial expansion device at both ends of the rolling pin to create a ¼ inch offset thereby allowing dough to be rolled out to ¼ inch in thickness. The user may then adjust the radial expansion devices to create a ⅛ inch offset thereby allowing dough to be rolled out to ⅛ inch. Subsequently, the user may then adjust the radial expansion device such that the radial expansion device has no offset relative to the rolling pin body, thereby allowing the rolling pin to be used as a typical rolling pin without the benefit of the radial expansion device. While various examples discussed herein may refer to imperial units, it will be appreciated that the radial expansion device may be adjusted based on metric units (e.g., 1 cm) or any other unit.

Figure 1:
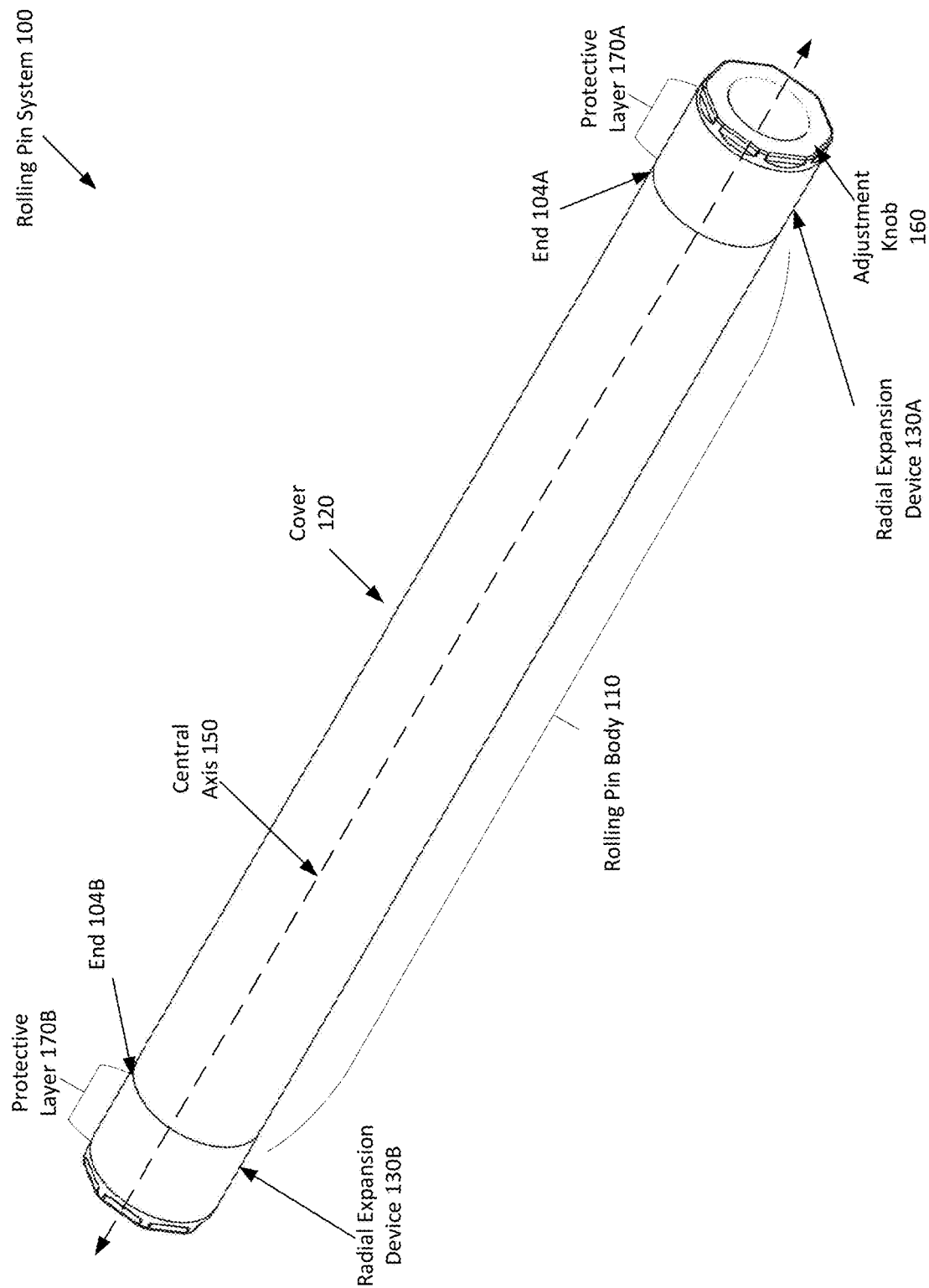
FIG. 1 depicts a perspective view of a rolling pin system according to some embodiments.

FIG. 1 depicts a perspective view of a rolling pin system 100 according to some embodiments. The example rolling pin system 100 includes a rolling pin body 110, a cover 120, radial expansion devices 130A and 130B (individually, collectively, radial expansion device 130), and protective layers 170A and 170B. The example rolling pin system 100 may include ends 104A and 104B. The example rolling pin system 100 may further include an adjustment knob 160.

The rolling pin body 110 is located between the radial expansion devices 130A and 130B. The rolling pin body 110 is the portion of the rolling pin used to roll out dough or similar material. The rolling pin body 110 has a cylindrical (or semi-cylindrical) surface configured to flatten dough for the purposes of baking or cooking. The rolling pin body 110 may be tapered or not tapered.

The rolling pin body 110 may be composed of wood, marble, polymer, ceramic, aluminum, silicon, stainless steel, or some combination thereof. The type of material used in the rolling pin body may depend on the type of material that the individual is trying to roll. A marble rolling pain typically stays colder for longer periods of time compared to wood or other materials, thereby keeping the dough (and incorporated fats) cool. Silicon rolling pins are durable and typically offer nonstick surfaces.

In some embodiments, the rolling pin body 110 may include the optional cover 120. The cover 120 is composed of a polymer (e.g., an elastomer) with both viscosity and elastic properties that enables the cover 120 to withstand forces applied to the rolling pin by the user and the material being rolled. Alternately, the cover 120 may be composed of, ceramic, or any other material(s).

The cover 120 may be smooth or textured to enable texture and/or tenderizing to be applied to the material being rolled. The cover 120 may be removable (e.g., as a sleeve) or permanently affixed to the rolling pin body 110. It will be appreciated that the cover 120 is optional such that the rolling pin body 110 may or may not have the cover 120. In some embodiments, the cover 120 is composed of an elastomer such as a polymer with both viscosity and elasticity properties.

The rolling pin body 110 may have any length suitable for use in the baking environment. For example, the rolling pin body 110 may have a length of 12 inches, 20 inches, 21.5 inches, or the like. As follows, the length of the rolling pin system 100 may have any length including the length of the rolling pin body 110 and the radial expansion devices 130A and 130B.

Each radial expansion device 130A and 130B is at an opposite end of the rolling pin body 110 (e.g., at end 104A and 104B, respectively). Alternately, each radial expansion device 130A and B may close (but not at) the ends 104A and 104B of the rolling pin body 110. In one example, each radial expansion device 130A and 130B is at an equal distance to an opposite end 104A or 104B of the rolling pin body 110. In a further example, each radial expansion device 130A and 130B is located two inches from the closest end 104A or 104B (with respect to that radial expansion device) of the rolling pin body 110. Each radial expansion device 130A and 130B may be at an equal distance (e.g., measured lengthwise) to the closest end 104A or 104B of the rolling pin body 110. Alternately, each radial expansion device 130A and 130B may be at different lengths from the ends 104A and 104B of the rolling pin body 110.

A central axis 150 for reference is positioned in the center of the rolling pin body 110.

In some embodiments, the protective layers 170A and 170B cover the radial expansion device 130A and 130B, respectively. The protective layers 170A and 170B are typically composed of a polymer (e.g., an elastomer) with both viscosity and elastic properties that enables the protective layers 170A and 170B to protect the radial expansion devices from dust, water, and particles of food (e.g., flour and dough). Alternately, the protective layers 170A and 170B may be composed of, ceramic, or any other material(s).

In various embodiments, the protective layers 170A and 170B stretch when the radial expansion devices 130A and 130B expand (e.g., the arms of the radial expansion devices 130A and 130B rotate outwards as described herein). In this example, the protective layers 170A and 170B withstand the forces on the rolling pin body 110 during use as well as forces caused by expansion of the radial expansion devices 130A and 130B. The protective layers 170A and 170B typically return to their original size and shape when the radial expansion devices 130A and 130B are closed (as discussed herein).

The protective layers 170A and 170B are typically coupled (e.g., held through mechanical means and/or adhered) to the rolling pin system 100 (e.g., coupled at least to the rolling pin body 110).

The cover 120 may be adhered or mechanically held to the rolling pin system 100 prior to the end and close to the position(s) where the protective layers 170A and 170B are adhered or mechanically held to the rolling pin system 100.

In various embodiments, the cover 120 encases the rolling pin body 110 and the radial expansion devices 130A, 130B. In one example, the rolling pin system 100 does not include protective layers 170A and 170B, but rather the cover 120 covers the radial expansion devices 130A and 130B. In this example, the cover 120 expands when pushed outwards by the expansion of the radial expansion devices 130A and 130B and return to the original shape when the radial expansion devices 130A and 130B are closed.

The rolling pin system 100 may include a controller or adjustment knob 160 that is not covered by the cover 120 or protective layers 170A and 170B). The adjustment knob 160 typically controls expansion and contraction of the radial expansion device 130A. Another adjustment knob (not depicted) is typically at the other end 104B of the rolling pin system 100 and controls expansion and contraction of the radial expansion device 130B. It will be appreciated that any mechanism(s) may be used to expand or contract the radial expansion devices 130A and 130B. the adjustment knob 160 is further described herein.

Figure 2A:
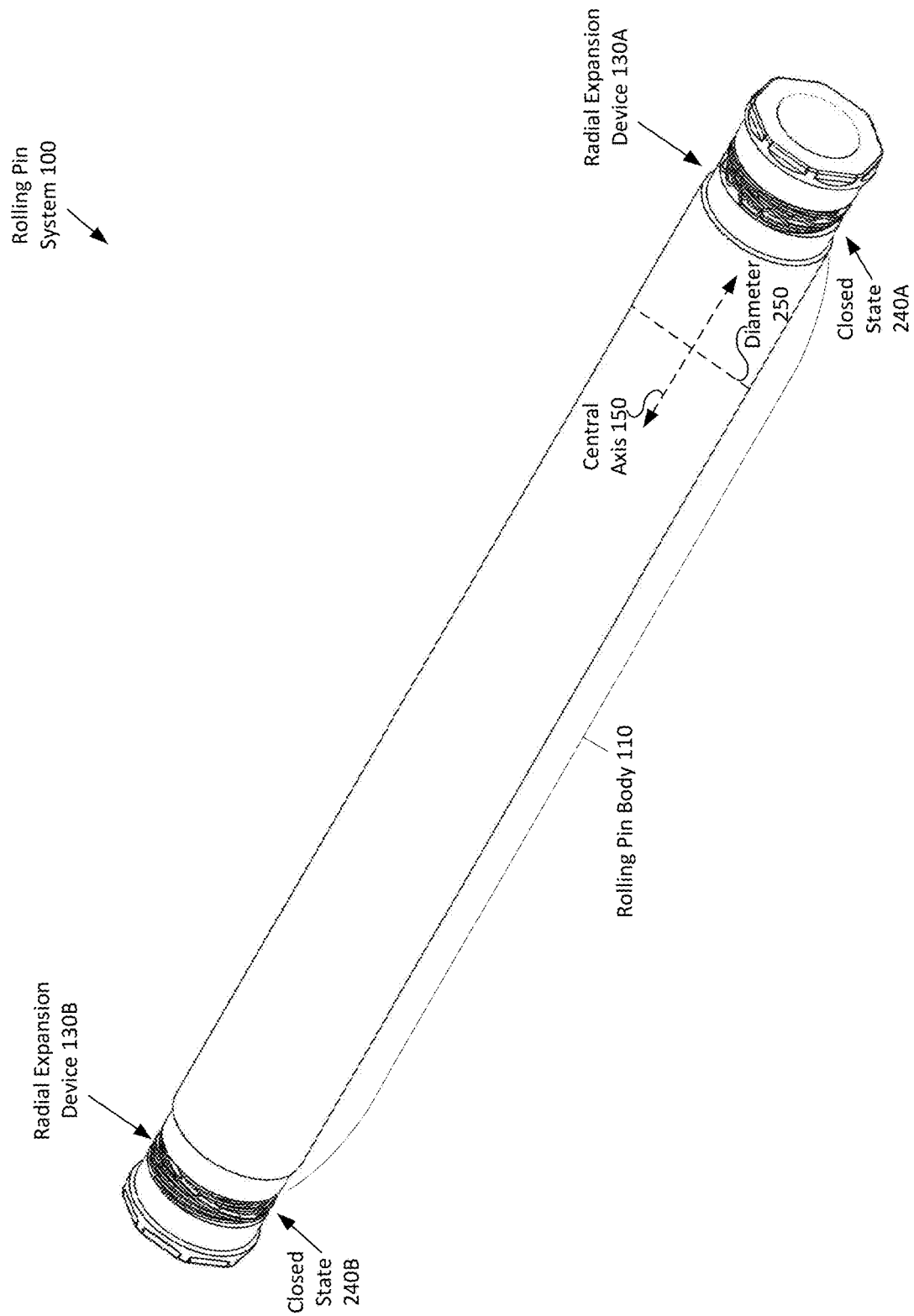
FIG. 2A depicts a perspective view of a rolling pin system without protective layers in which arms of the radial expansion devices are in closed states according to some embodiments.
Figure 2B:
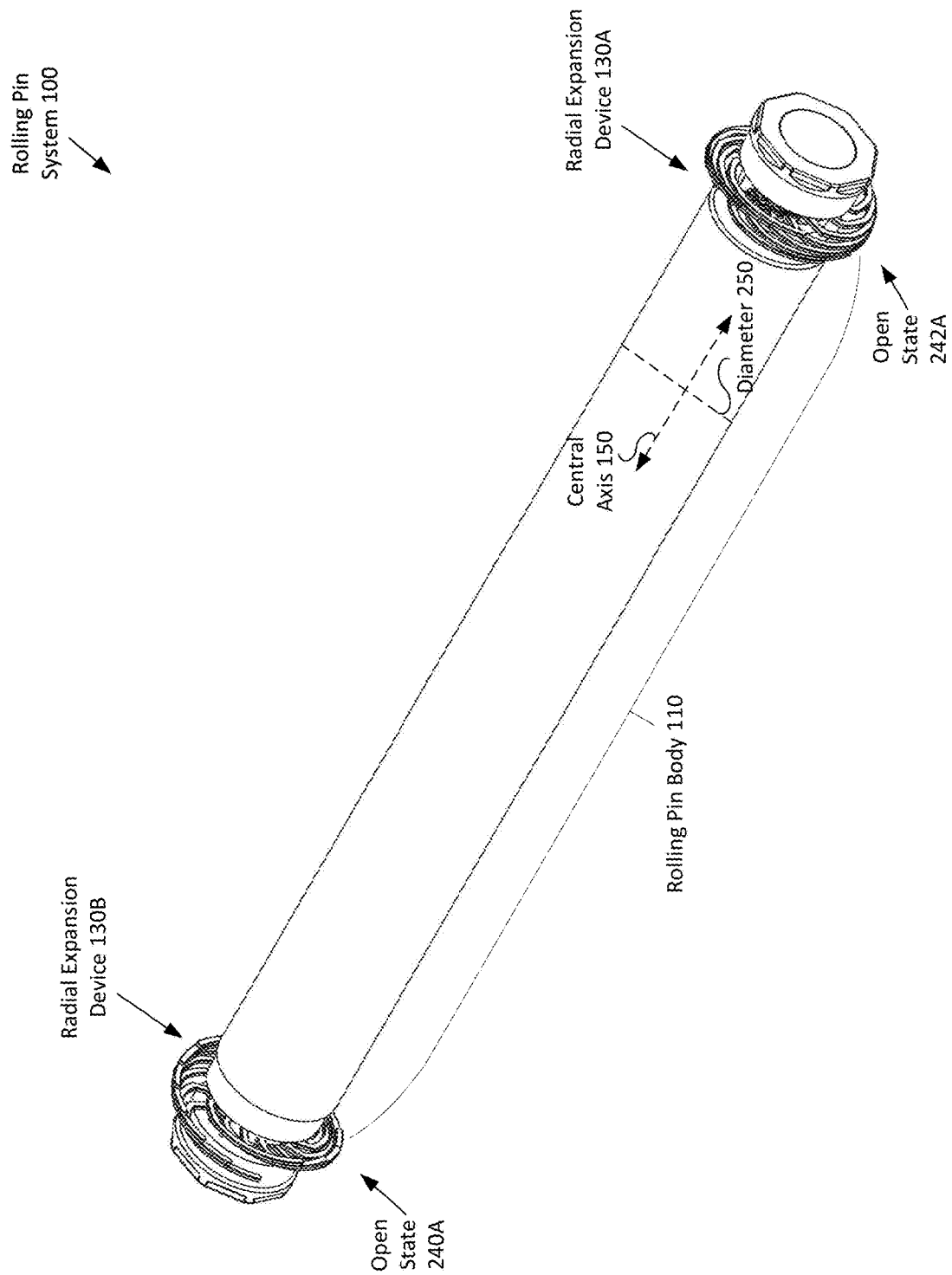
FIG. 2B depicts a perspective view of the rolling pin system with the radial expansion device in which arms of the radial expansion devices are in an open states according to some embodiments.
Figure 2C:
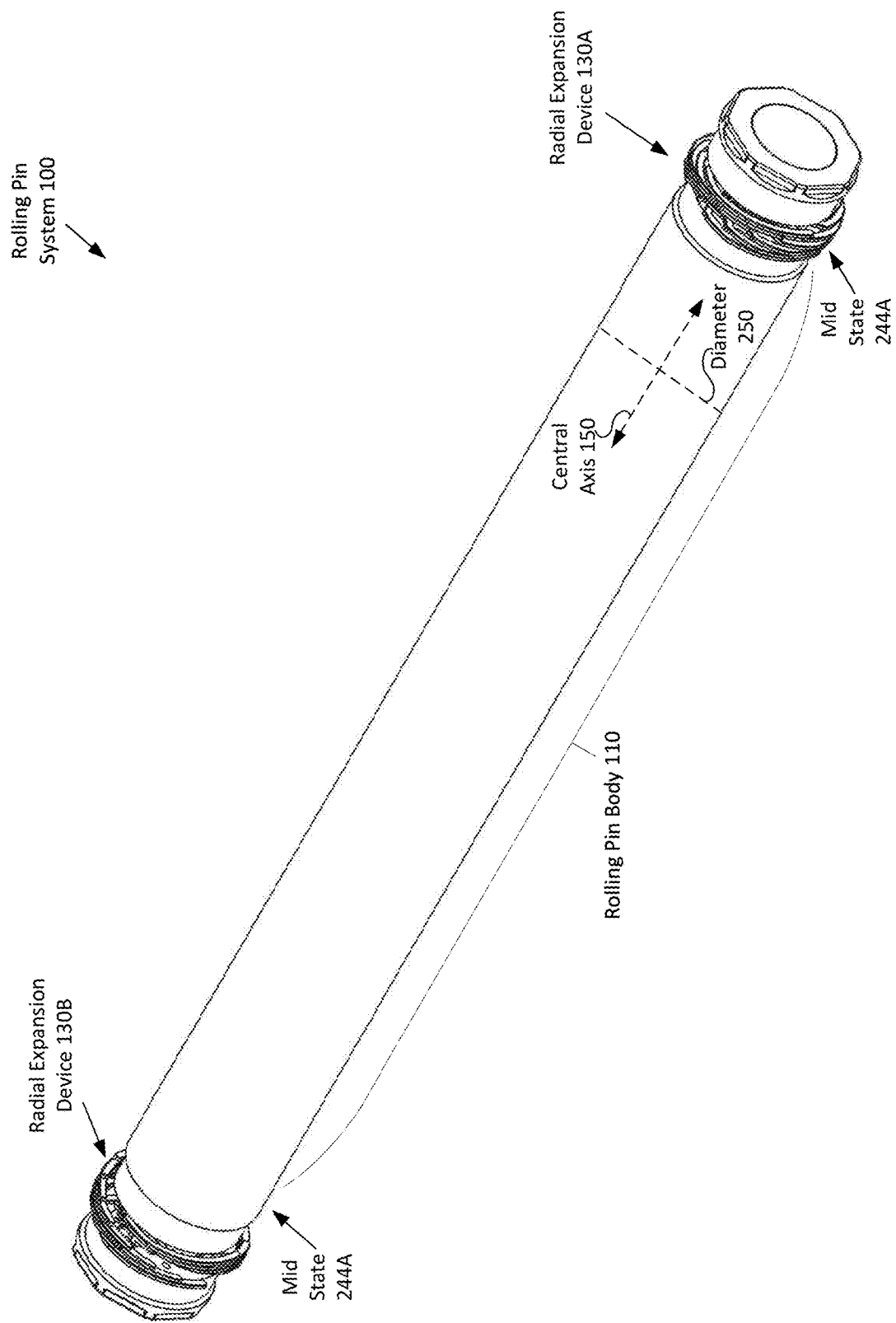
FIG. 2C depicts a perspective view of the rolling pin system with the radial expansion device in which arms (of the radial expansion devices) are in a mid-states according to some embodiments.

FIGS. 2A-2C each depict a perspective view of the rolling pin system 100 shown without a protective layers 170A and 170B covering the radial expansion devices 130A and 130B for the purpose of illustration. Each FIGS. 2A, 2B, and 2C depicts the radial expansion device 130A configured in different states. In FIG. 2A, the radial expansion device 130A is in a "closed" state. In FIG. 2B, the radial expansion device 130A are in an "open" state. In FIG. 2C, the radial expansion device 130A is in a "middle" state (e.g., a mid-state). It will be appreciated that the radial expansion device 130A may be set to a variety of different states (e.g., at predetermined settings) which create different diameters.

FIG. 2A depicts a perspective view of a rolling pin system 100 without protective layers 170A and 170B in which arms (e.g., arms 450 of FIG. 4A) of the radial expansion devices 130A and 130B are in closed states 240A and 240B according to some embodiments. In the rolling pin system 100 seen in FIG. 2A, some of the components which make up the radial expansion device 130A may be seen. In the closed state 240A and closed state 240B, the arms 450 of the radial expansion devices 130A and 130B are retracted such that the arms 450 of the radial expansion devices 130A and 130B form a diameter that is equal, substantially equal, or less than the diameter 250 of the rolling pin body 110 (e.g., the diameter being perpendicular to the central axis 150). In closed states 240A and 240B, the radial expansion devices 130A and 130B do not provide an offset from the diameter of a rolling pin body 110.

FIG. 2B depicts a perspective view of the rolling pin system 100, with the radial expansion device 130A in which arms (e.g., arms 450 of FIG. 4B) of the radial expansion devices 130A and 130B are in an open states 242A according to some embodiments. In the open state 242A, the arms 450 of the radial expansion devices 130A and 130B, respectively, are expanded such that the arms 450 of the radial expansion devices 130A and 130B are expanded to a diameter that is greater than the diameter 250 of the rolling pin body 110. In mid-states 244A, the radial expansion devices 130A and 130B provide a particular offset from the diameter of a rolling pin body 110 which allows dough or other material to be rolled out with a particular thickness.

FIG. 2C depicts a perspective view of the rolling pin system 100, with the radial expansion device 130A in which arms (e.g., arms 450 of FIG. 4C) of the radial expansion devices 130A and 130B are in a mid-states 244A according to some embodiments. In the mid-states 244A, the arms 450 of the radial expansion devices 130A and 130B, respectively, are expanded such that the arms 450 of the radial expansion devices 130A and 130B are expanded to a diameter that is greater than the diameter 250 of the rolling pin body 110 but less than the diameter of the open states 242A. In mid-states 244A, the radial expansion devices 130A and 130B provide a particular offset from the diameter of a rolling pin body 110 which allows dough or other material to be rolled out with a particular thickness that is less than the thickness allowed in the open states 242A (of FIG. 2B) but more than the diameter 250 of the rolling pin body 110.

Figure 3:
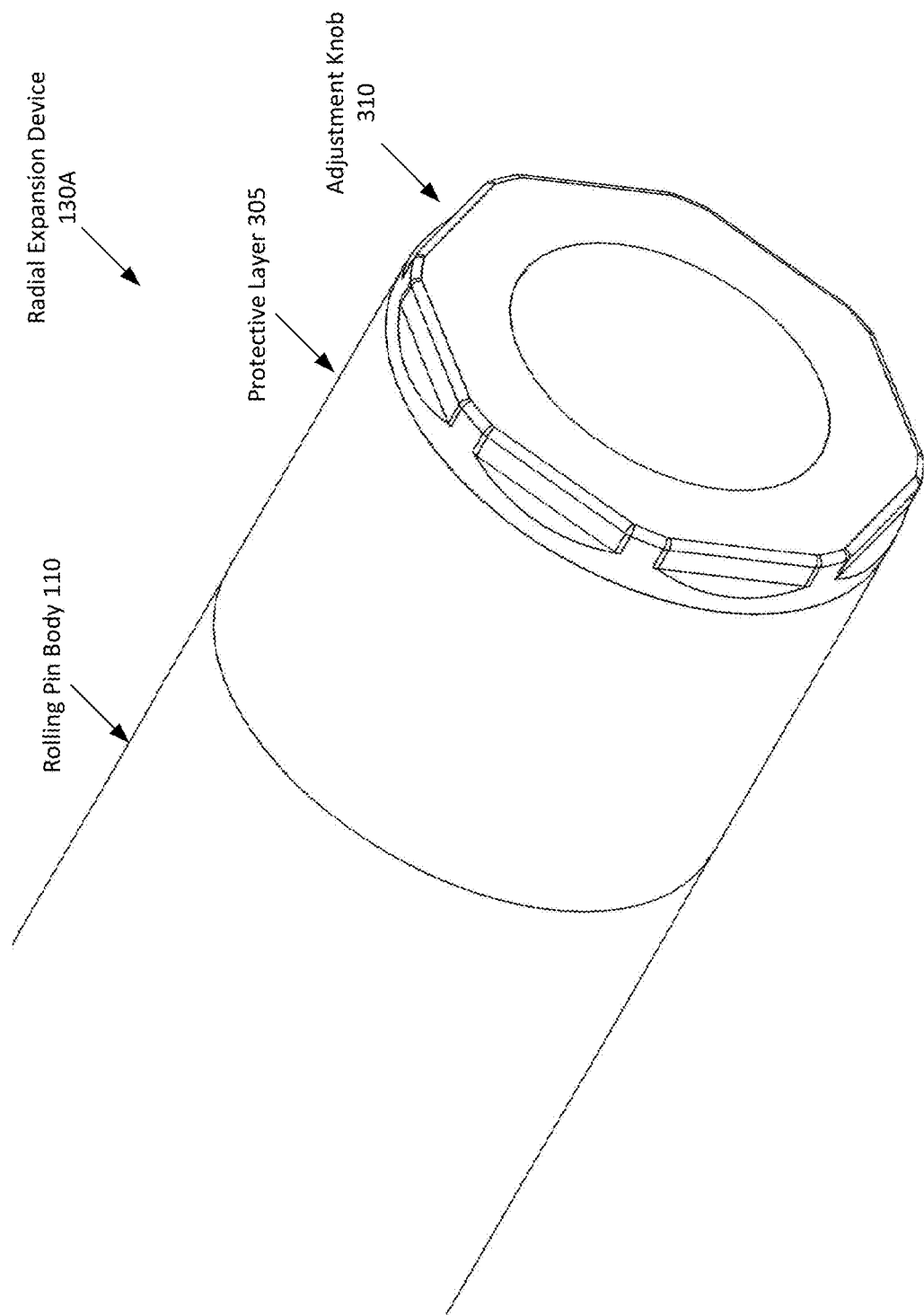
FIG. 3 depicts a close-up perspective view of the radial expansion device according to some embodiments.

FIG. 3 depicts a close-up perspective view of a radial expansion device 130A according to some embodiments. As discussed herein, the radial expansion device 130A may be coupled to one end 104A or 104B (see FIG. 1) of the rolling pin body 110. In some embodiments, the radial expansion device 130A includes a protective layer 305 and an adjustment knob 310. The protective layer 305 may encase or envelop the radial expansion device 130A thereby protecting components of the radial expansion device 130A from flour, water, and particles of food products (e.g., dough or flour). In some embodiments, the protective layer 305 possesses viscosity and elasticity properties which are identical to those of the protective layer 170A of FIG. 1. In some embodiments, the adjustment knob 310 may be positioned at each end 104A and 104B of the rolling pin system 100 of FIG. 1 (e.g., the adjustment knob 310 may be the adjustment knob 160). The adjustment knob 160 is typically used to change the state of the radial expansion device 130A (e.g., from the closed state 240A to the mid-state 244A or the open state 242A).

Figure 4A:
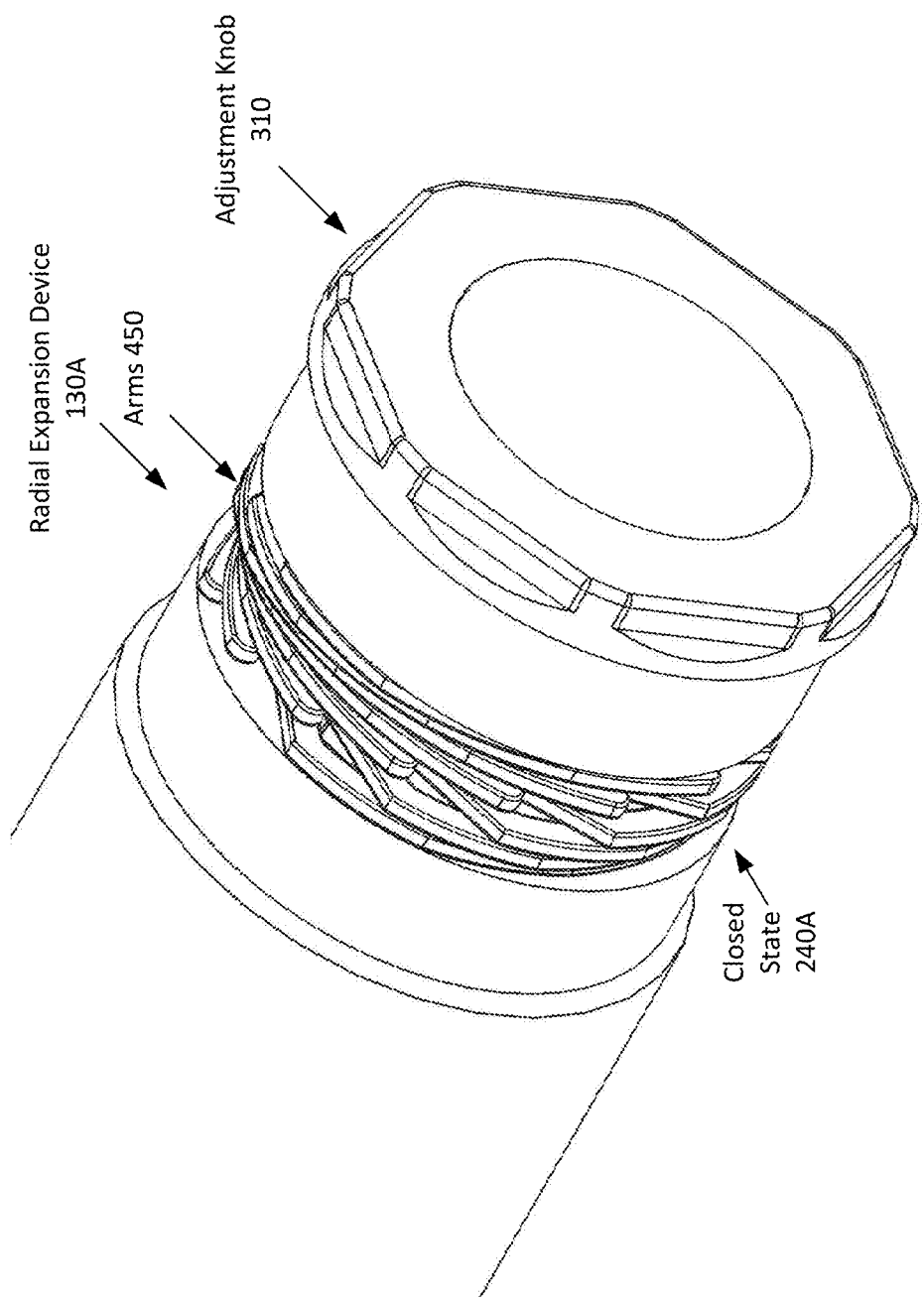
FIG. 4A depicts a close-up perspective view of the radial expansion device in which arms of the radial expansion device are in a closed state according to some embodiments.

FIG. 4A depicts a close-up perspective view of radial expansion device 130A in which arms 450 of the radial expansion device 130A are in a closed state 240A according to some embodiments. The user may interact with an adjustment knob 310 to rotate the arms 450 from the closed state to one or more prearranged settings (e.g., each with a different offset relative to the diameter of the closed state).

In various embodiments, in each of the prearranged settings other than the closed setting, the arms 450 create circular spirals (e.g., circular helixes) of a different diameter than the diameter 250 (See FIG. 2A) of the rolling pin body 110 (See FIG. 2A) to create different offsets. An example of the placement of the arms 450 around a base component of the radial expansion device 130A can be found in FIG. 6C, which depicts the placement and configuration of eight arms 450 in a closed state 240A.

Figure 4B:
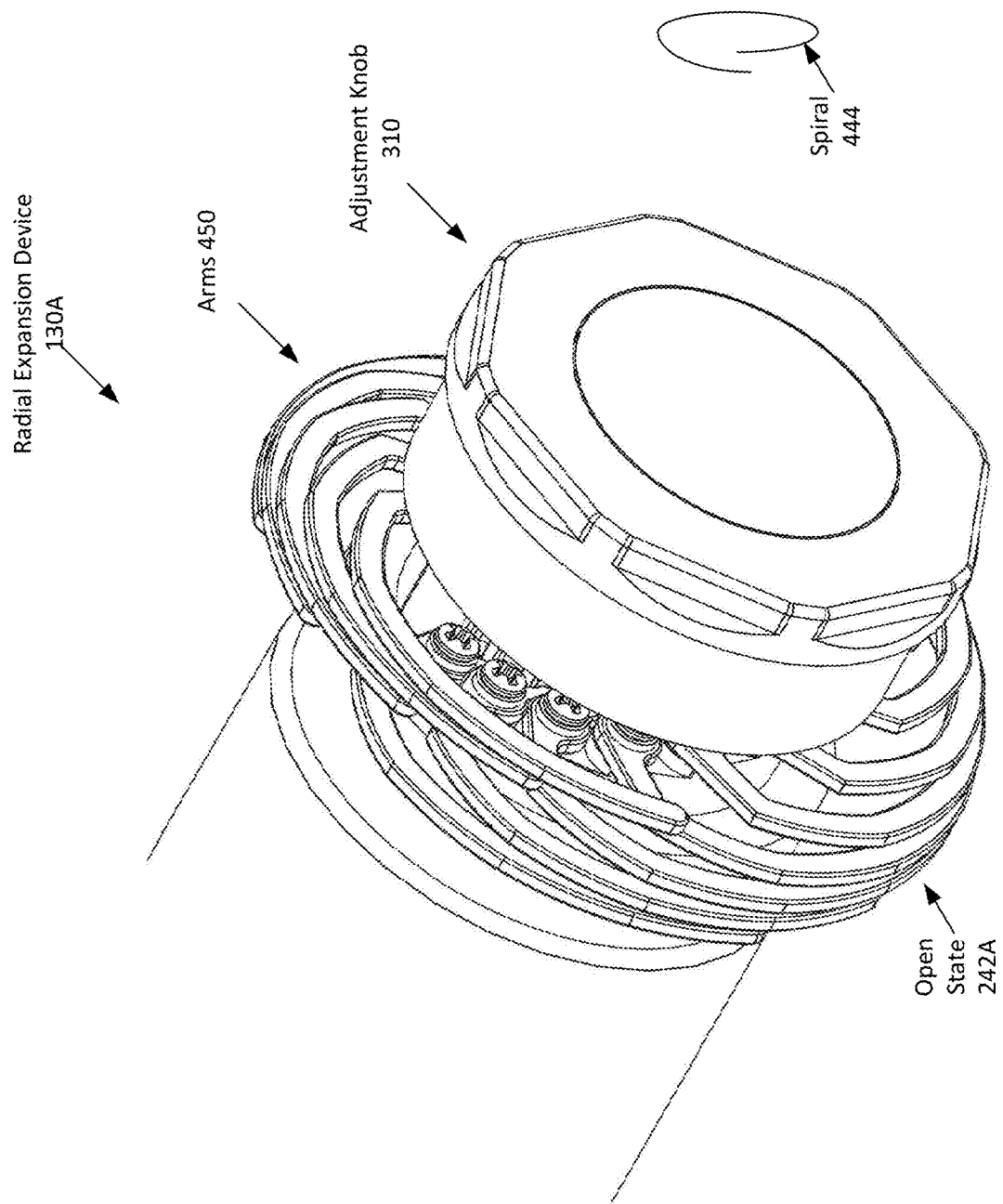
FIG. 4B depicts a close-up perspective view of the radial expansion device in which arms of the radial expansion device are in an open state according to some embodiments.

FIG. 4B depicts a close-up perspective view of the radial expansion device 130A in which arms 450 of the radial expansion device 130A are in an open state 242A according to some embodiments. In the open state 242A, the arms 450 are rotated to create a circular pattern composed of a circular spiral 444 which includes a ⅜ inch offset relative to the diameter 250 (See FIG. 2B) of the rolling pin body 110 (See FIG. 2B).

As depicted in FIG. 4B, all or a portion of each of the arms 450 are adjacent to another arm. For example, each arm 450 may overlap with each other relative to the end 104A or 104B with the adjustment knob 310. In this example, portions of each arm 450 (e.g., arc sections of each arm discussed herein) may be positioned such that the same portion of each arm 450 is configured to structurally support the rolling pin and the function of rolling dough, food, or the like. Each arm 450 may be locked into the position for the prearranged setting to prevent any of the arms 450 from collapsing to the closed setting or to changing to a different prearranged position.

It will be appreciated that, in some embodiments, the portions of each arm do not collectively form an enclosed circle, but rather a spiral of arm portions (e.g., arc lengths) with the same offset (e.g., the spiral has a consistent diameter in each of the non-closed prearranged settings). The circular spiral may have a rotation angle of at least 360 degrees (e.g., the portions of each of the arms 450 form a circular spiral that is substantially 360 degrees).

For example, the portion of each arm 450 may form a spiral 444 where the arm portions maintains the same offset (e.g., the same diameter) relative to the rolling pin system 100.

Figure 4C:
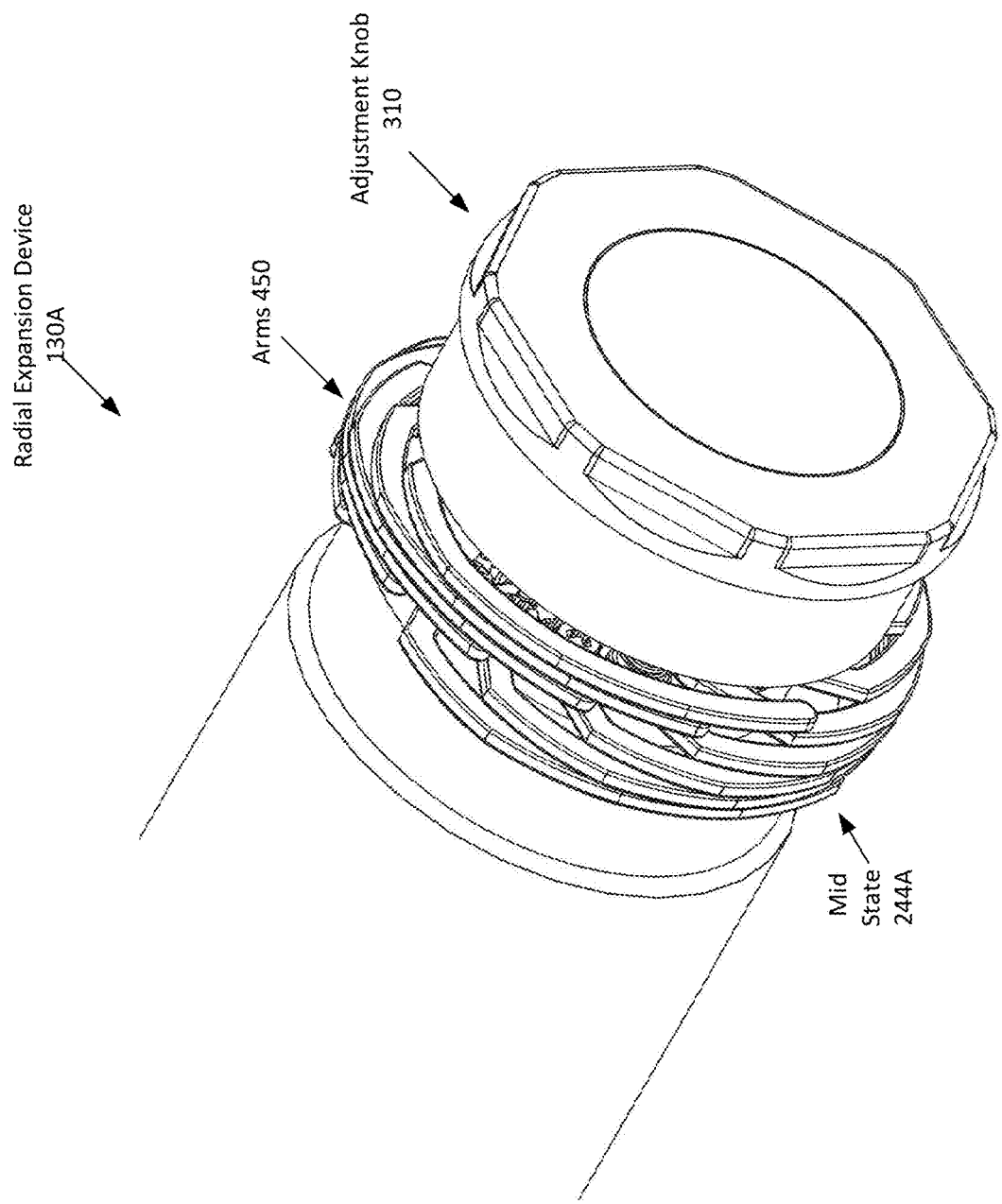
FIG. 4C depicts a close-up perspective view of the radial expansion device in which arms of the radial expansion device are in a midpoint state according to some embodiments.

FIG. 4C depicts a close-up perspective view of the radial expansion device 130A in which arms 450 of the radial expansion device 130A are in a mid-state 244A according to some embodiments. In the mid-state 244A, the arms 450 may be rotated to create a concentric circle (e.g., in a spiral) that includes a ⅛ inch relative to the diameter 250 (See FIG. 2B) of the rolling pin body 110 (See FIG. 2B).

Figure 5A:
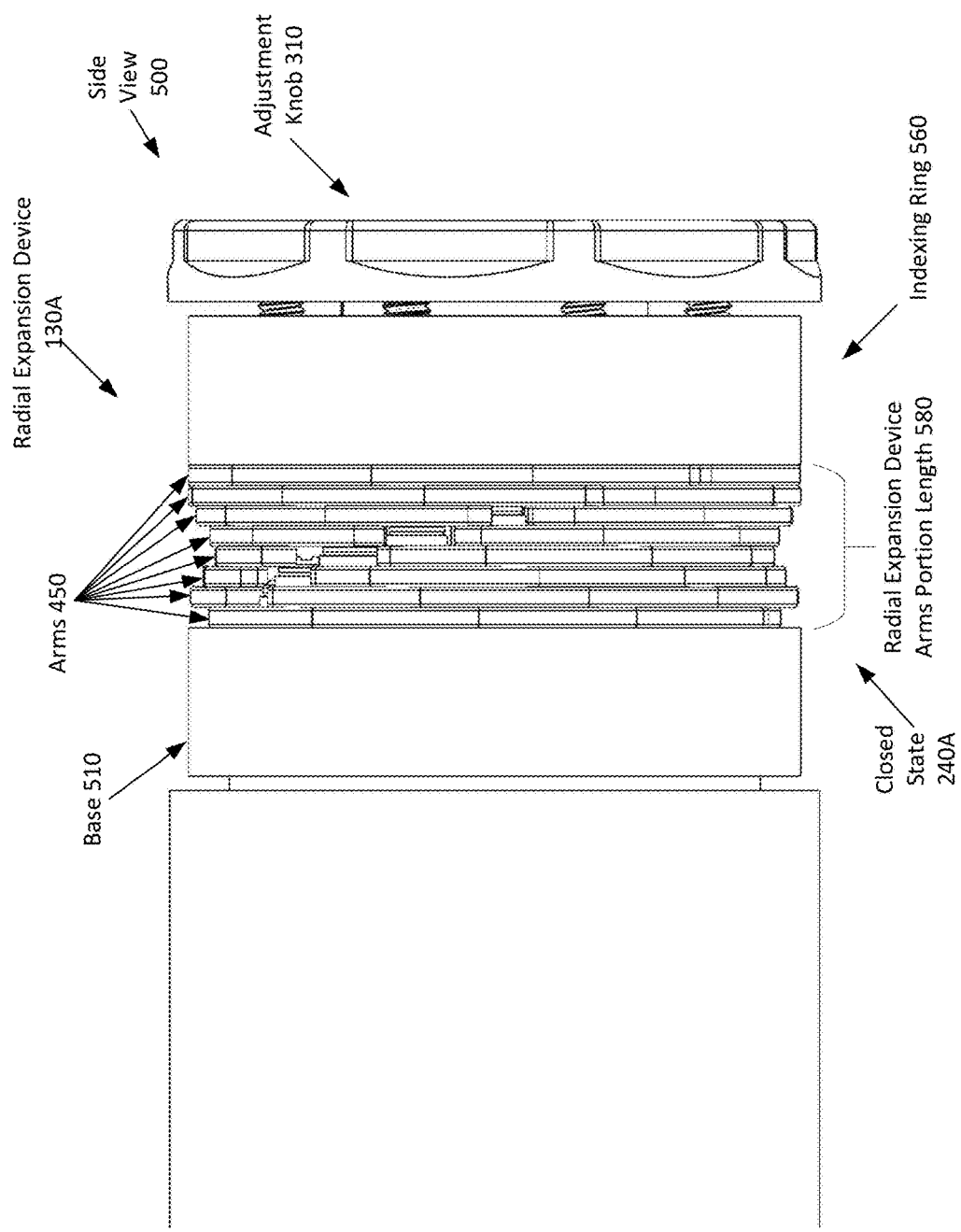
FIG. 5A depicts a close-up side view of the radial expansion device in which arms of the radial expansion device are in a closed state according to some embodiments.

FIG. 5A depicts a close-up side view 500 of the radial expansion device 130A in which arms 450 of the radial expansion device 130A are in a closed state 240A according to some embodiments. In FIG. 5A, there are 8 arms 450 which are adjacent to each other. The arms portion length 580 depends on the width of each of the arms 450. It will be appreciated that each arm 450 may have a width that is consistent with every other arm. In some embodiments, one or more arms may have a different width than each other.

The arms 450 are typically arranged in a circular pattern. The arms 450 may be rotatably coupled to a base 510. The arms 450 in FIG. 5A are adjacent to one another in a concentric fashion such that as each of the arms 450 are rotated from one prescribed setting to another, they will not collide or be bound with one another.

In this example, an indexing ring 560 is be positioned over the arms 450 to assist with locking the arms 450 at different settings. The user typically turns the adjustment knob 310 to adjust the indexing ring 560 and alter an offset of the arms 450. More details regarding the indexing ring 560 and adjustment knob 310 will be discussed in FIG. 11A.

Figure 5B:
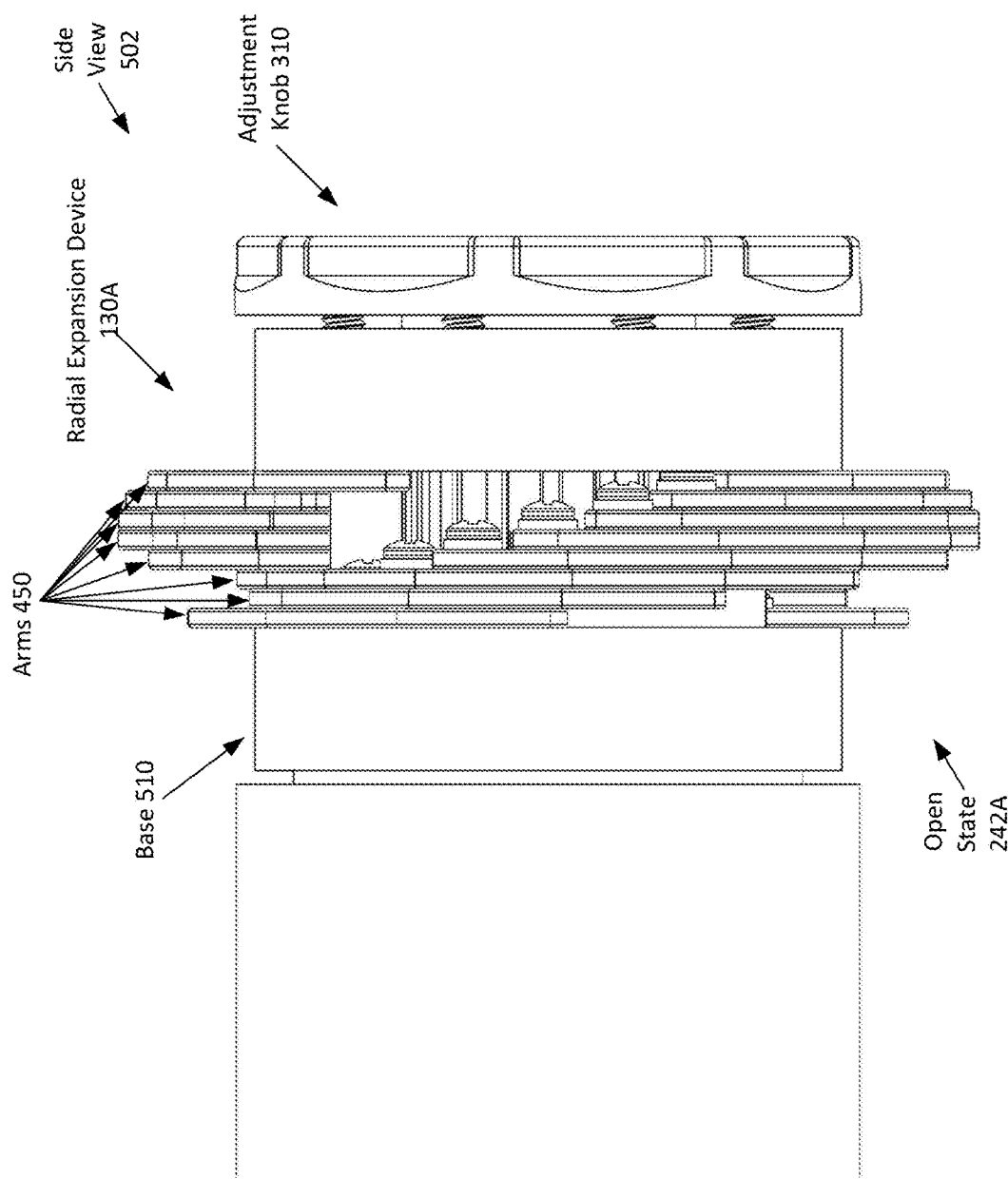
FIG. 5B depicts a close-up side view of the radial expansion device in which arms of the radial expansion device are in an open state according to some embodiments.

FIG. 5B depicts a close-up side view 502 of the radial expansion device 130A in which arms 450 of the radial expansion device 130A are in an open state 242A according to some embodiments.

In one example, the user interacts with the adjustment knob 310 to rotate the arms 450 outward to form a circular spiral which includes a ⅜ inch offset from the diameter 250 (see FIG. 2B) of rolling pin body 110 (see FIG. 2B).

Figure 5C:
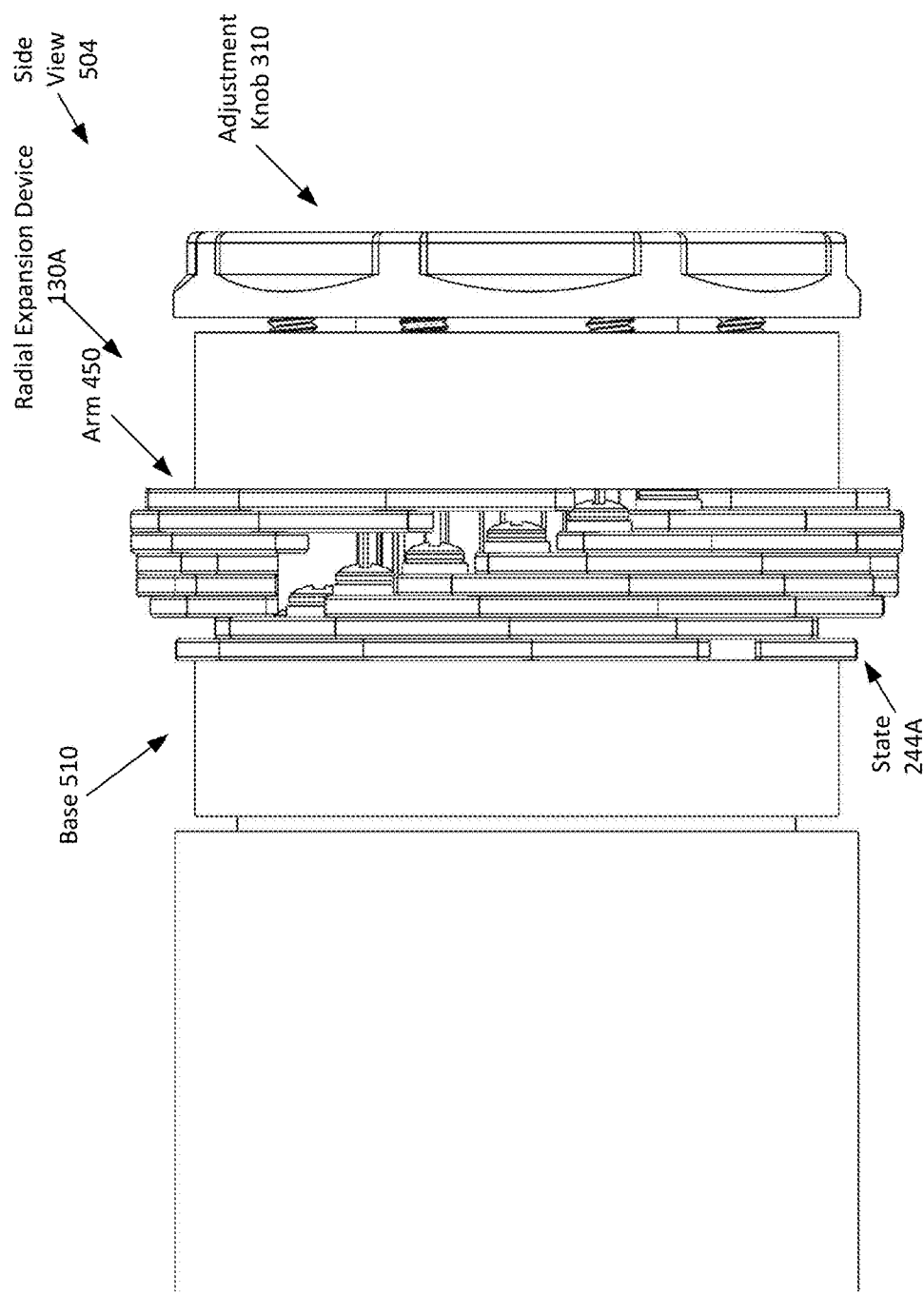
FIG. 5C depicts a close-up side view of the radial expansion device in which arms of the radial expansion device are in a mid-state according to some embodiments.

FIG. 5C depicts a close-up side view 504 of the radial expansion device 130A in which arms 450 of the radial expansion device 130A are in a mid-state 244A according to some embodiments. In the mid-state 244A, the arms 450 are typically rotated to create a circular spiral which includes a ⅛ inch offset of the diameter 250 (see FIG. 2B) of the rolling pin body 110 (see FIG. 2B).

It will be appreciated that the radial expansion device 130A or 130B may be utilized in many different apparatuses, machines, and/or systems. The radial expansion device 130A or 130B are capable of creating a different circular spiral to support many different applications (e.g., not just limited to rolling pins and baking). For example, the radial expansion device 130A or 130B may be utilized in automotive industries, the space industry, fishing, towing, turning machine, and the like. FIGS. 6A-6C, 7-9, and 10A-E describe a radial expansion device 130A or 130B that may be utilized in combination with many different systems.

Figure 6A:
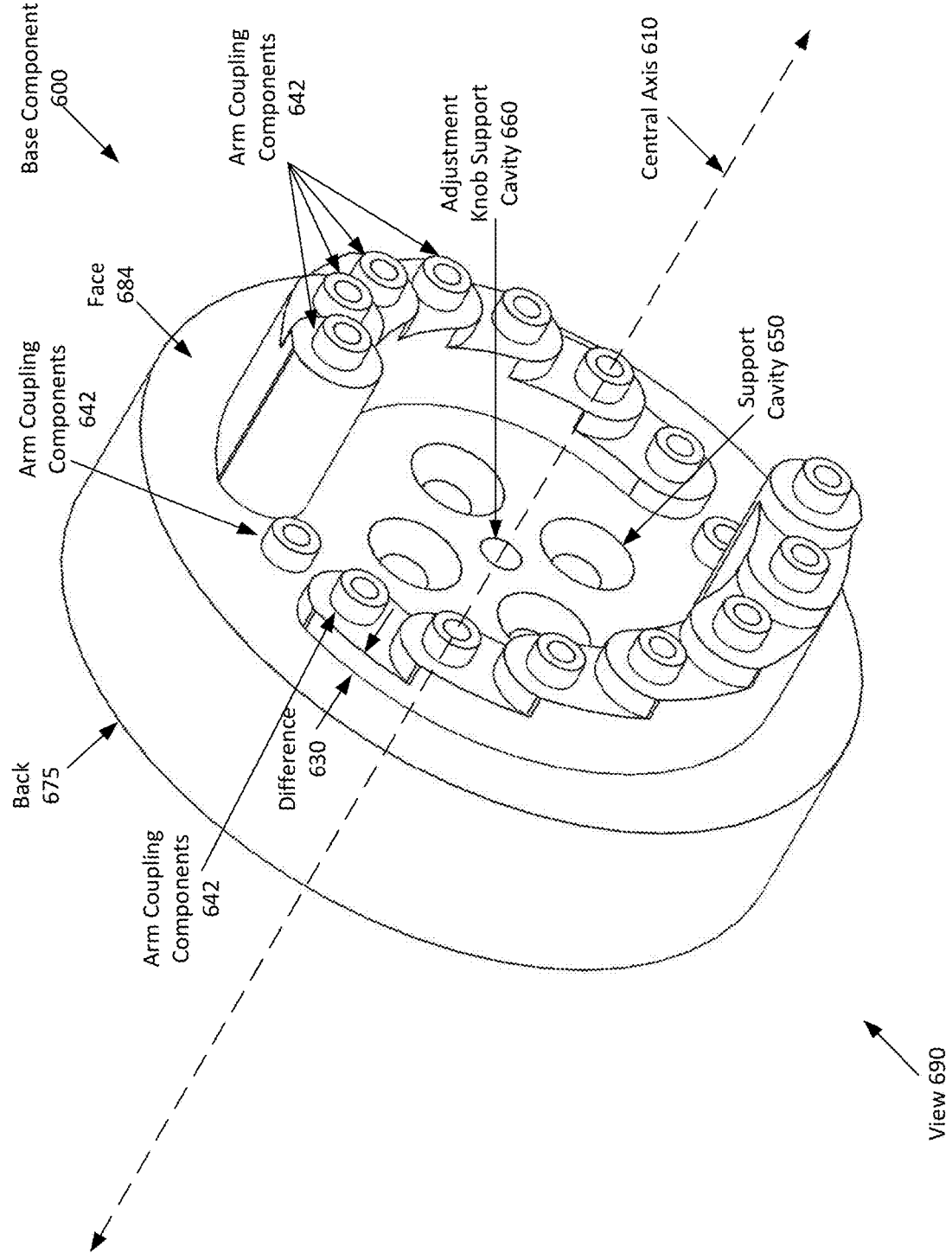
FIG. 6A depicts a perspective view of a base component according to some embodiments.

FIG. 6A depicts a perspective view 690 of a base component 600 according to some embodiments. The base component 600 is a part of the radial expansion device (such as radial expansion device 130A or 130B coupled to a rolling pin system 100 as show in FIG. 1). The base component 600 of the radial expansion device may be utilized as a part of many different apparatuses and systems as discussed herein. The base component 600 is typically a single unit (e.g., molded from a polymer or metal) but in some embodiments, the base component 600 may include several components coupled together.

The base component 600 includes arm coupling components 642 (e.g., threaded or unthreaded holes). In the example of FIG. 6A, there are 16 arm coupling components 642. It will be appreciated that the base component 600 may be any number of arm coupling components 642. In a further example, there may be an even or odd number of arm coupling components 642.

To eliminate the possibility of the arms 450 colliding with one another when the arms 450 are rotated to form different circular spirals of different diameters, the arm coupling components 642 are offset or stepped (e.g., the offsets forming a series of steps from the face 684. The difference between the height of the steps in each of the arm coupling components 642 may be slightly greater than the thickness of each arm 450 (e.g., the difference 630 is equal or slightly greater than the width one of arm 450), such that, as the arms 450 of the radial expansion device rotate, they will not collide with one another.

In the example of FIG. 6A, two of the arm coupling components 642 do not have a standoff relative to the face 684 of the base component 600. Every other pair of arms 450 share the same standoff length (i.e., a particular distance 630) from the face 684. The face 684 is opposite the back 675 of the base component 600. In other words, every two arm coupling components 642 may be positioned at a similar distance (e.g., a similar difference 630) from the face 684. A standoff has a difference 630 that is a particular width.

Each of the arm coupling components 642 is typically coupled to a different arm (e.g., arm 450 as show in FIG. 4C). The arm coupling components 642 are in a circular pattern around a central axis 610. The central axis 610 may be the central axis 150 shown in FIG. 1.

In the example in FIG. 6A, there are two sets of arm coupling components 642. For example, a radial expansion device with 16 arms 450 may include four sets of arm coupling components 642, with each set of arm coupling components 642 being at different heights relative to the face 684.

The base component 600 may be comprised of metal, a polymer such as an acetal resin, or any other materials. In some embodiments, the base component 600 is composed of self-lubricating plastic such as DUPONT's DELRIN®. In one embodiment, the base component 600 is composed of a material that is resistant to moisture, heat, chemicals, and solvents.

The base component 600 may include multiple support cavities, such as support cavity 650. One or more support members are typically inserted through the support cavity 650 to a body of an attached apparatus (e.g., the rolling pin system 100 see FIG. 1) to anchor the radial expansion device. In some examples, the support members are metal or wood screws, wooden dowels, wooden rods, or polymer support beams. There may be any number of support cavities 650.

An adjustment knob support cavity 660 is a hole to assist with configuring settings using the adjustment knob 310 (see FIG. 5C). The adjustment knob support cavity 660 is typically positioned in the center of the base component 600 (e.g., along the central axis 610). It will be appreciated that the adjustment knob 310 may operate in many different ways to adjust positions of the arms 450 and may not require the adjustment knob support cavity 660 (or the adjustment knob support cavity 660 may be in a different position rather than along the central axis 610).

Figure 6B:
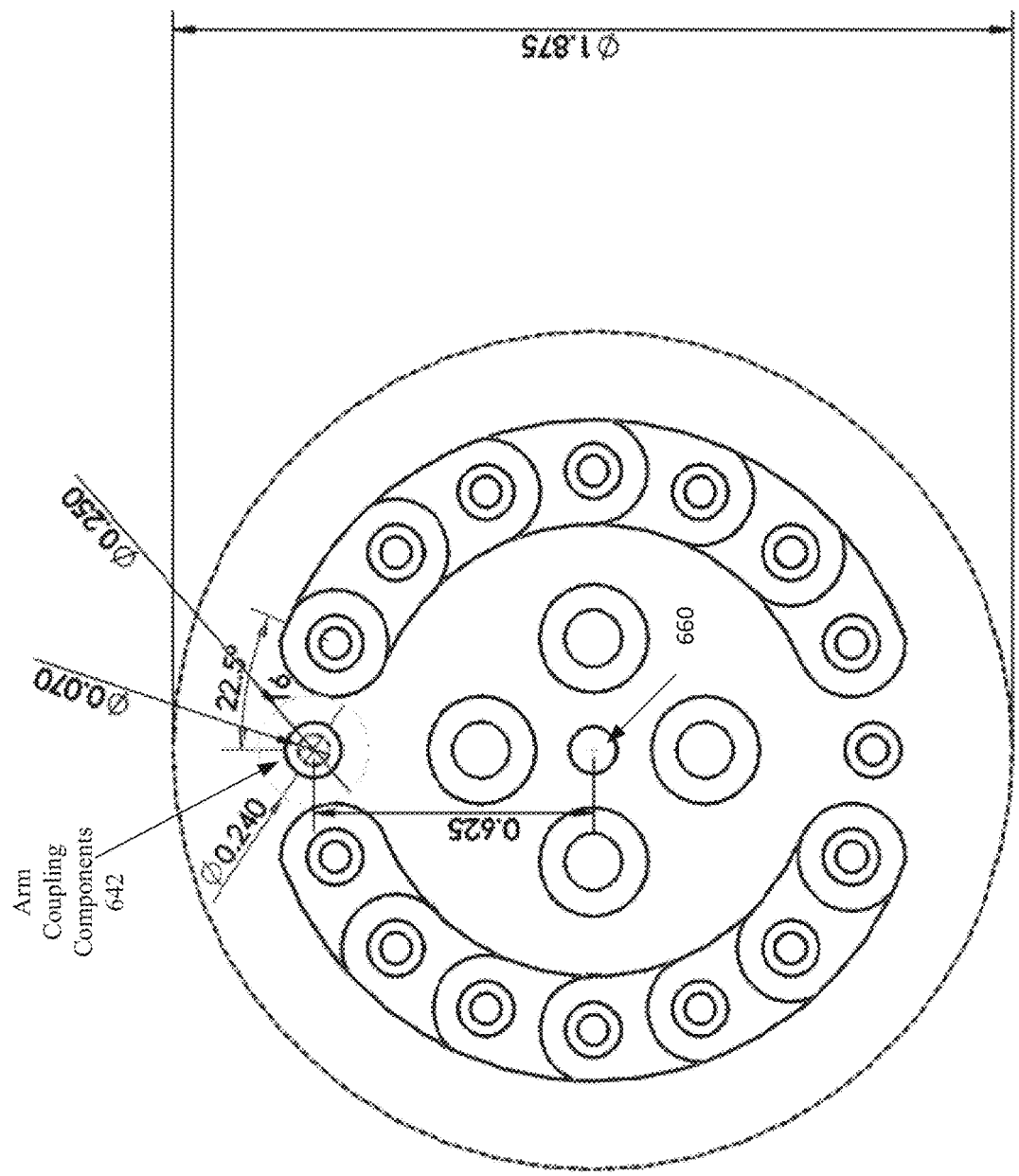
FIG. 6B depicts dimensions of the base component according to some embodiments.

FIG. 6B depicts dimensions of the base component 600 according to some embodiments. In this example, the base component 600 has a diameter of 1.875 inches. 0.625 inches separates the center of each arm coupling components 642 from the center of the base (e.g., the center of the adjustment knob support cavity 660). In this example, the degree separation relative to the center of the base component 600 between two arm coupling components 642 is 22.5°.

Other embodiments may include larger bases or smaller bases. The degree of separation between arm coupling components 642 typically depends on the number of arm coupling components 642 and/or the size of each arm coupling component 642. It will be appreciated that the distance between each arm coupling components 642 to the center of the base component 600 may be the same or different than any other arm coupling components 642. Further, in some embodiments, the distance between one or more arm coupling components 642 and the center of the base may be any length.

Figure 6C:
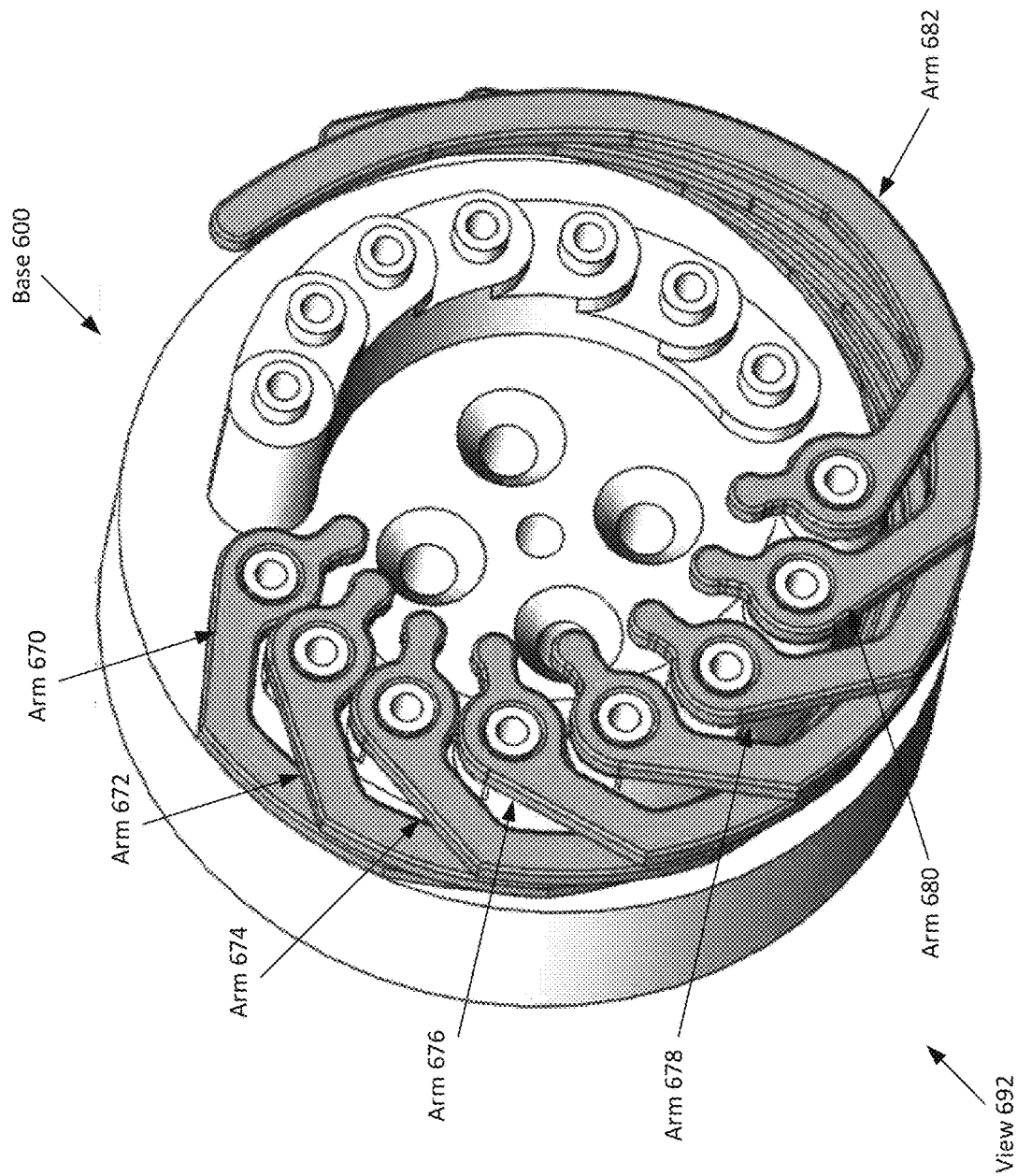
FIG. 6C depicts a perspective view of a base component with eight arms installed according to some embodiments.

FIG. 6C depicts a perspective view 692 of a base component 600 with eight arms 670, 672, 674, 676, 678, 680, and 682 installed according to some embodiments. As depicted in view 692, the base component 600 includes arms 670, 672, 674, 676, 678, 680, and 682 arranged in a half-circle. The base component 600 depicted in view 692 includes eight arm coupling components 642 that are not coupled to arms 450 to show how arms 450 are coupled and arranged relative to the base component 600.

In some embodiments, the arms 670, 672, 674, 676, 678, 680, and 682 are arranged over one set of arm coupling components 642. When arms 670, 672, 674, 676, 678, 680, and 682 are rotated about their respective arm coupling components, at least one arc section 722, 724, 726, or 728 (see FIG. 7) of each of the multiple arms 450 are arranged in a circular pattern with a diameter that is offset from a central axis 610 (see FIG. 6A).

Each arm 670, 672, 674, 676, 678, 680, and 682 depicted in FIG. 6C is adjacent to another arm 670, 672, 674, 676, 678, 680, and 682. Each arm 670, 672, 674, 676, 678, 680, and 682 is rotationally coupled to a separate arm coupling component 642. The arms are further discussed herein.

Figure 7:
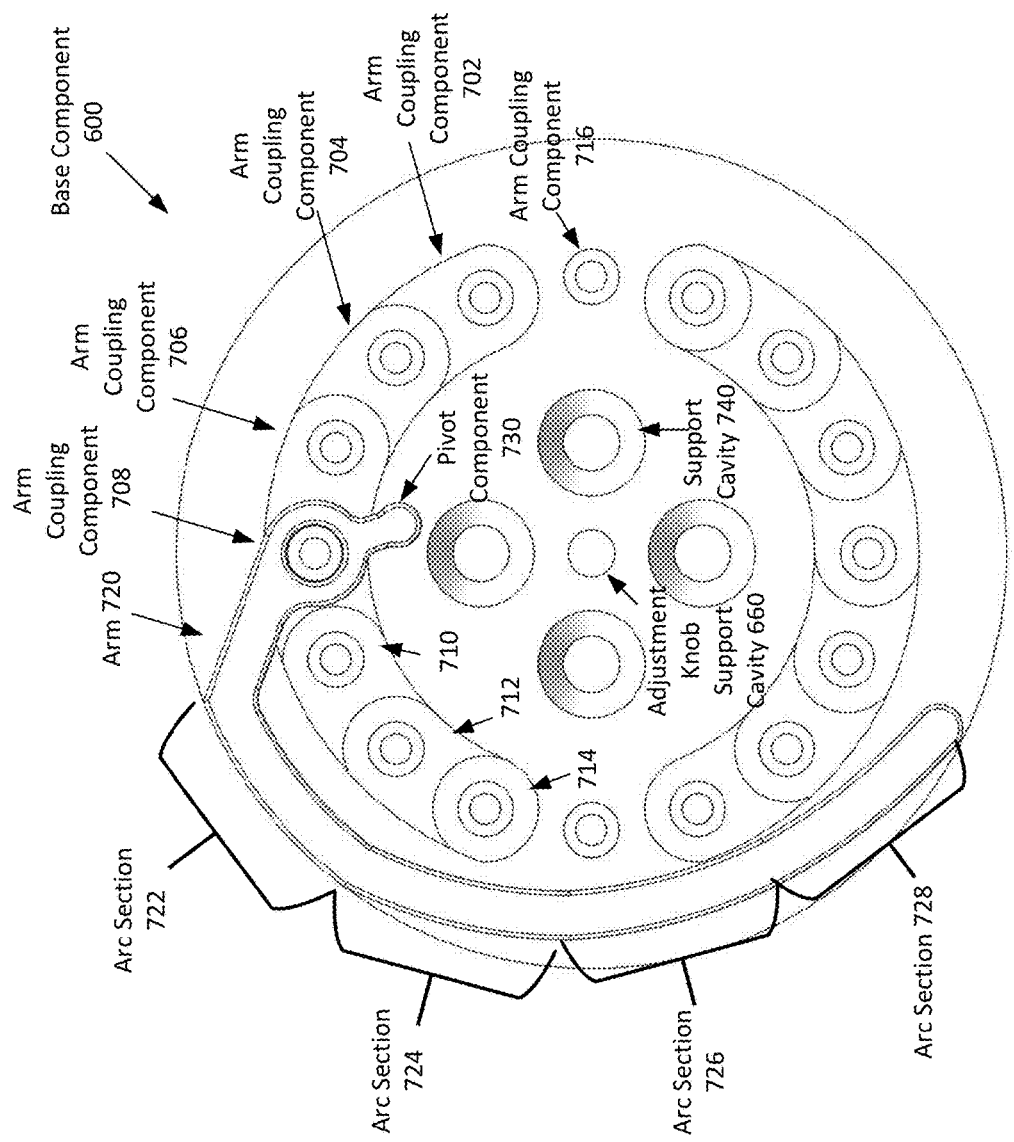
FIG. 7 depicts an arm installed on the base component according to some embodiments.

FIG. 7 depicts an arm 720 (similar to any of the arms 670, 672, 674, 676, 678, 680, and 682 depicted in FIG. 6C) installed on a base component 600 according to some embodiments. The base component 600 includes two sets of arm coupling components 702, 704, 706, 708, 710, 712, 714, and 716. Two arm coupling components that are directly across from each other (e.g., on opposite sides of the adjustment knob support cavity 660) have the same offset (e.g., height from the face 684 of the base component 600, the face 684 depicted in FIG. 6A).

FIG. 7 depicts sixteen arm coupling components 702, 704, 706, 708, 710, 712, 714, and 716 as well as others not labeled in FIG. 7. In other embodiments, each set of arm coupling components may include fewer or more arm coupling components. For example, a radial expansion device with 16 arms may include four sets of arm coupling components, with each set of arm coupling components including four stepped arm coupling components of different heights. In various embodiments, the minimum number of arms is 16. In one embodiment, the number of arms is an even number.

Each arm (e.g., arms 670, 672, 674, 676, 678, 680, and 682 as depicted in FIG. 6A are typically mounted to a separate arm coupling component (e.g., arm coupling components 702, 704, 706, 708, 710, 712, 714, or 716). One arm 720 is depicted in FIG. 7 as being coupled to the base component 600 via arm coupling component 708 for an example. The arm 720 is typically mounted to arm coupling components 708 by an arm fastener (not shown). The arm 720 may be rotatably coupled to the arm coupling component 708 in any number of ways (e.g., using screws, rivets, ball bearings, and/or the like).

The pivot component 730 is an elongated member coupled to the end of the arm 720 that is closest to the arm coupling component 708. Each arm (e.g., 670, 672, 674, 676, 678, 680, and 682 as depicted in FIG. 6A) may include a separate pivot component 730. A mechanical action may pull, push, or turn the pivot component 730 such that the arc sections 722, 724, 726, and 728 of the arm 720 rotate outward away from the adjustment knob support cavity 660. Alternately, the pivot component 730 may be held or locked in place such that the arm does not rotate further about the arm coupling component 708.

In this example, the arm 720 includes arc sections 722, 724, 726, and 728. Each arc section 722, 724, 726, and 728 may have a different curvature (e.g., a different degree of curvature). Although four arc sections 722, 724, 726, and 728 are depicted in FIG. 7, there may be any number of act sections 722, 724, 726, and 728. Typically, there is a different arm coupled to a different arm coupling component with each arm including the same number of arc sections. Similarly, the curvature of each arc section of an arm typically matches at least one arc section of each other arm. For example, the arc section at the end of the arm (e.g., arc section 728) may match the curvature of the arc section at the end of each of the other arms.

The base component 600 may include multiple support cavities, such as support cavity 650. Support members may be inserted through the support cavity 740 to a body of an apparatus or other support structure to anchor the base component 600. In some embodiments, the support members (not shown in FIG. 7) may be metal or wood screws, wooden dowels, wooden rods, or polymer support beams. The base component 700 may further include an adjustment knob support cavity 660.

Figure 8:
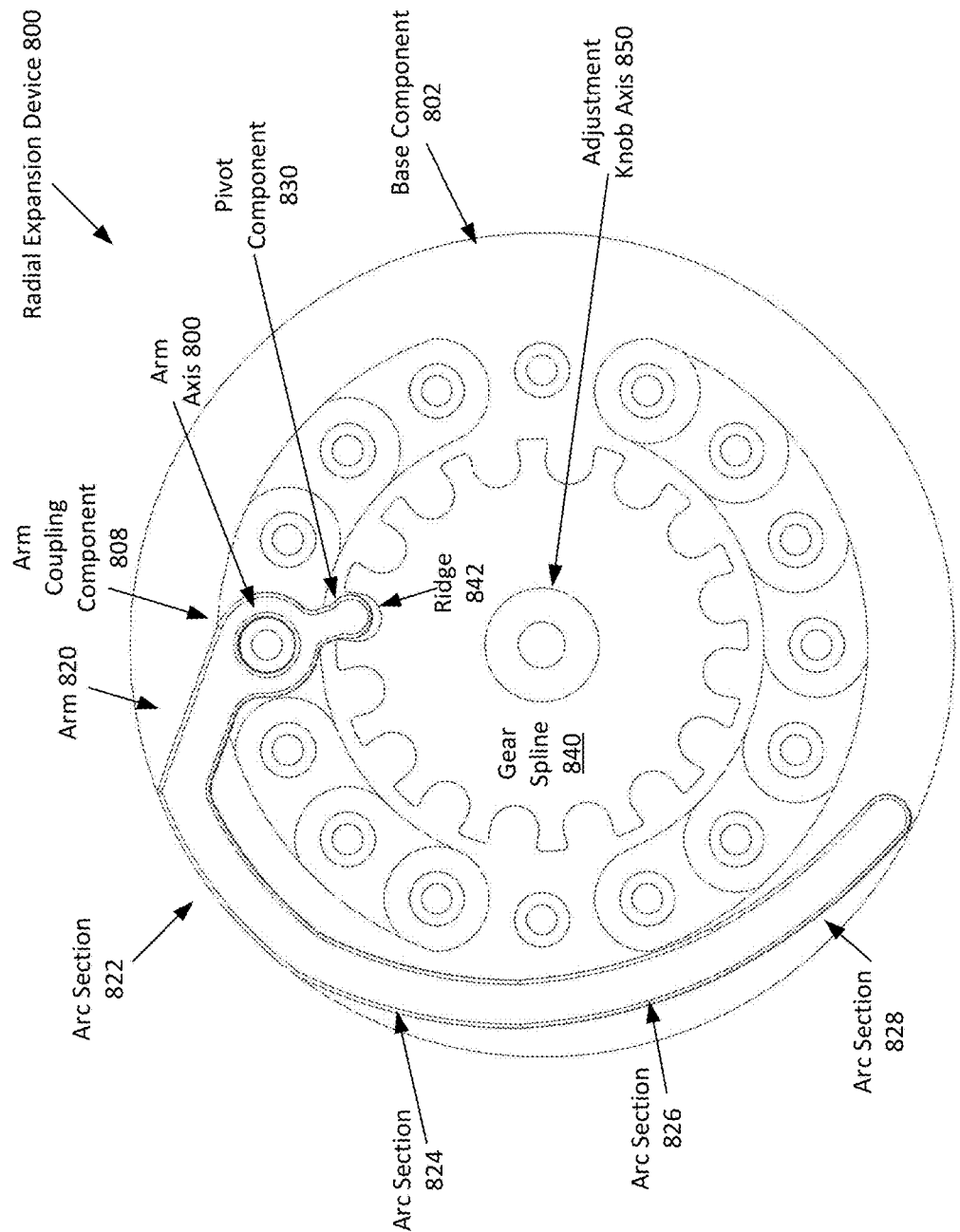
FIG. 8 depicts a base component of a radial expansion device with an arm and gear spline according to some embodiments.
Figure 9:
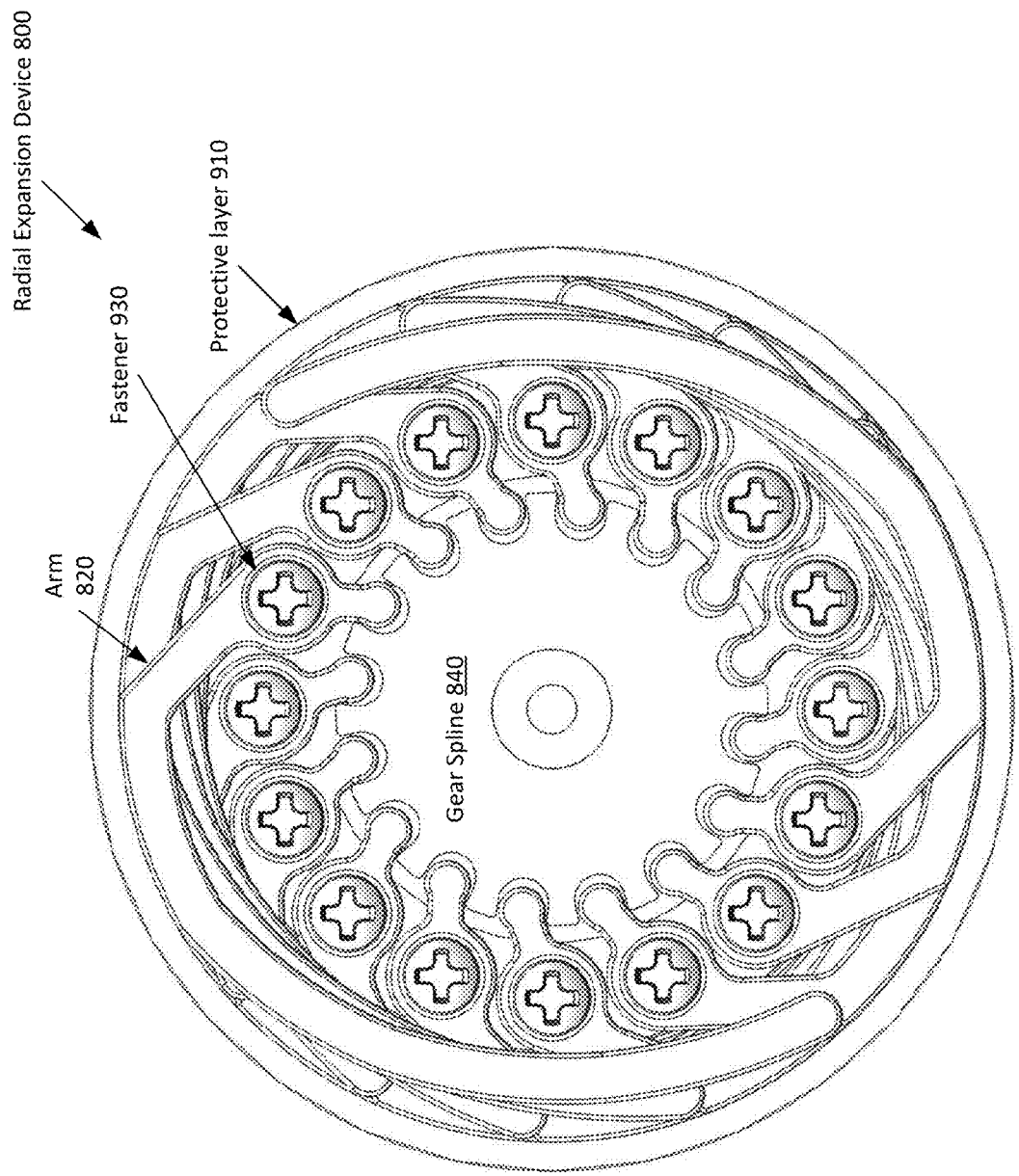
FIG. 9 depicts a view of the arms fastened to the gear spline by fasteners according to some embodiments.

FIGS. 8 and 9 depict a radial expansion device 800 with a gear spline 840 for configuring settings for expansion of arms (e.g., arm 820 of FIGS. 8 and 9 as well as the other arms depicted in FIG. 9). FIG. 8 depicts a base component 802 of a radial expansion device 800 with an arm 820 and gear spline 840 according to some embodiments. The arm 820 is rotatably coupled to an arm coupling component 808 of the base component 802.

The arm 820 may include arc sections 822, 824, 826, and 828 and a pivot component 830. The pivot component 830 of the arm 820 mechanically interfaces with teeth of the gear spline 840. The gear spline 840 is supported by a support member extending through the center of the gear spline 840.

The gear spline 840 includes multiple teeth and ridges such as ridge 842 that forms a cavity to hold the pivot component 830. Each cavity of the gear spline 840 may retain a different pivot component of a different arm (not shown in FIG. 8). When the gear spline 840 is turned, the pivot component 830 of the arm 820 (as well as the pivot components of the other arms) rotate about the arm coupling component 808. Similarly, each of the pivot components of the arms mechanically interface with a different cavity of the gear spline 840.

As the gear spline 840 is rotated about an adjustment knob axis 850 (e.g., counterclockwise in the example of FIG. 7), the arm 820 pivots the arc sections 822, 824, 826, and 828 outwards away from the adjustment knob axis 850.

In one example, a user rotates an adjustment knob (not shown) that turns the gear spline 840 counterclockwise to open the arms (including arm 820) of the radial expansion device 800. The degree that the gear spline 840 is turned changes the state of the multiple arms of the radial expansion device 800 from one state to another, which changes the diameter of a circular spiral of arms (e.g., the circular spiral defined by the outer circumference of the corresponding arc sections 822 of each arm 450). In various embodiments, the user rotates an adjustment knob clockwise to close the arms (including arm 820) and reduce the diameter of the circular spiral of arms. It will be appreciated that the adjustment knob (not depicted in FIG. 8) may be turned in any direction to open or close the arms.

FIG. 9 depicts components of a radial expansion device 800, arms (e.g., including arm 820) fastened to the gear spline 840 by fasteners (e.g., including fastener 930) according to some embodiments. In this example, the radial expansion device 800 includes a protective layer 910, multiple arms including the arm 820, multiple fasteners including fastener 930, and the gear spline 840.

As similarly described in FIG. 1, the protective layer 910 surrounds the radial expansion device 800 and typically protects the arms (including arm 820) and the gear spline 840 from debris. The protective layer 910 may be composed of an elastomer, a polymer, and protect the components of the radial expansion device 800 from flour, water, dust, and dough. As arms of the radial expansion device 800 are opened and closed, the protective layer 910 may expand and contract to accommodate the changing diameter of the radial expansion device 800.

Each of the multiple arms (including arm 820) may be attached to an arm coupling component (including the arm coupling component 808 of FIG. 8) by fasteners (including the fastener 930). In some embodiments, the fastener 930 is a fastener such as a screw made of any material (e.g., stainless-steel). Alternately, the fastener 930 may be or include a rivet, ball bearings, and/or the like.

Each arm (including arm 820) may be made of any material. In one example, each of the multiple arms (including arm 820) is composed of stainless steel. In various embodiments, the arms may be composed of stainless steel with a polymer covering. Each arm may include a number of predefined arcs as shown in FIG. 10A.

In the illustrated example, the radial expansion device 800 includes 16 arms mounted on two sets of stepped arm coupling components, where each set of stepped arm coupling components includes eight arm coupling components. A minimum number of arms required in order to obtain a circular spiral to maintain overlap between arms may be determined based on the offset required and the number of arcs.

Figure 10A:
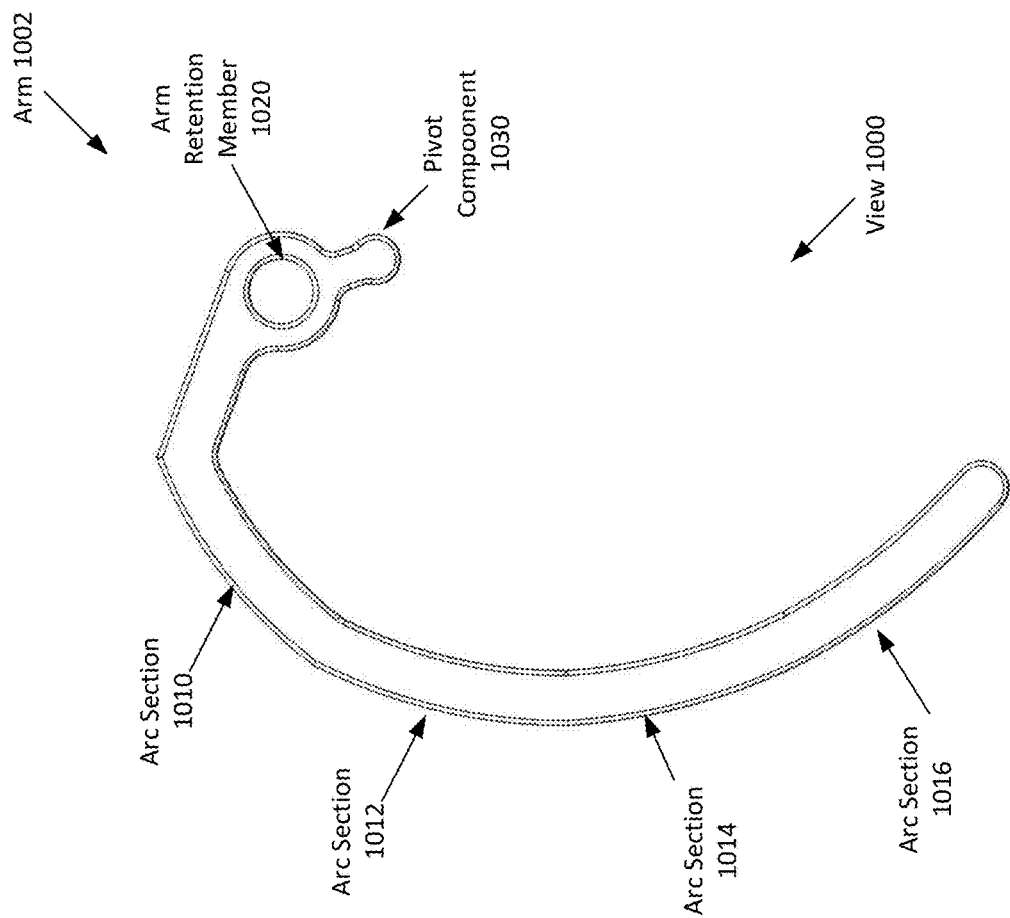
FIG. 10A depicts a view of an arm according to some embodiments.

FIG. 10A depicts a view 1000 of an arm 1002 according to some embodiments. The arm 1002 includes arc sections 1010, 1012, 1014, and 1016, arm retention member 1020, and a pivot component 1030. Each of the arms of the radial expansion device 800 depicted in FIG. 9 may be identical to the arm 1002.

The arm 1002 may be composed of any rigid material. By rotating the arm 1002, different arc sections 1010, 1012, 1014, and 1016 in combination with similar arc sections of other arms cooperate to create one of four different offsets. Each offset is of a different diameter formed by corresponding arc sections of the different arms. In various embodiments, the four different offsets may be 0 inches (i.e., no offset), ⅛ inch offset, ¼ inch offset, and ⅜ inch offset. The arm 1002 may be mounted to the base component via the arm retention member 1020 (which in this example is a circular cavity to assist a fastener to fasten the arm 1002 to an arm coupling component discussed herein.

As discussed herein, the pivot component 1030 mechanically interfaces with a mechanism (e.g., ridge or teeth of the gear spline 840 of FIG. 8) to rotate the arm 1002 about the arm retention member 1020. The arm retention member 1020 typically is coupled to a base component via a fastener as discussed herein. In some embodiments, the length of each arc section is the diameter of a circle divided by the number of arms in the radial expansion device. For example, the circular spiral may have a diameter of 2.5 inches, which corresponds to a ¼ inch offset from the diameter when the arms are closed.

Figure 10B:
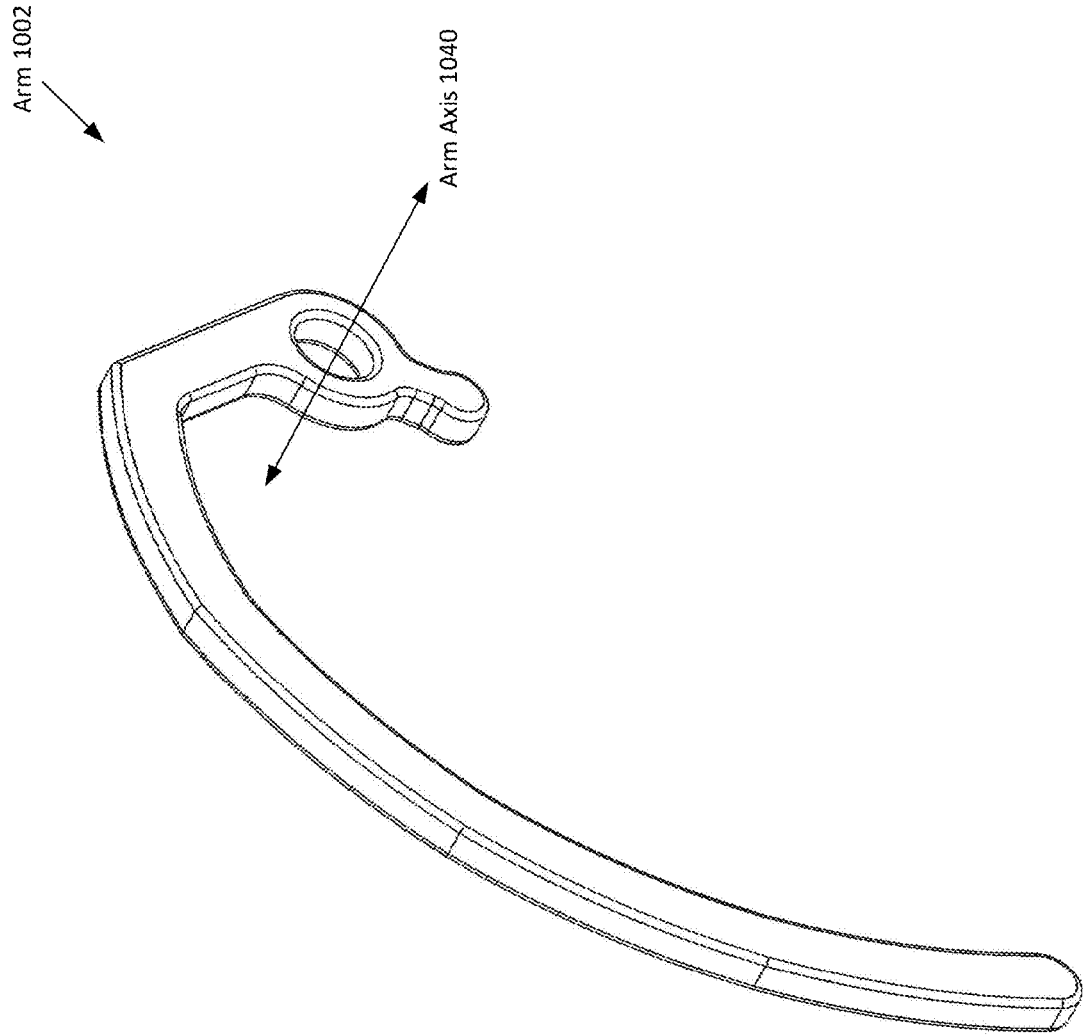
FIG. 10B depicts another view of the arm according to some embodiments.

FIG. 10B depicts another view of the arm 1002 according to some embodiments. FIG. 10B includes an arm axis 1040 which passes through the arm retention member 1020. When the arm 1002 interfaces with the mechanism, such as the gear spline 840 of the FIG. 8, the arm 1002 will rotate about the arm axis 1040.

Figure 10C:
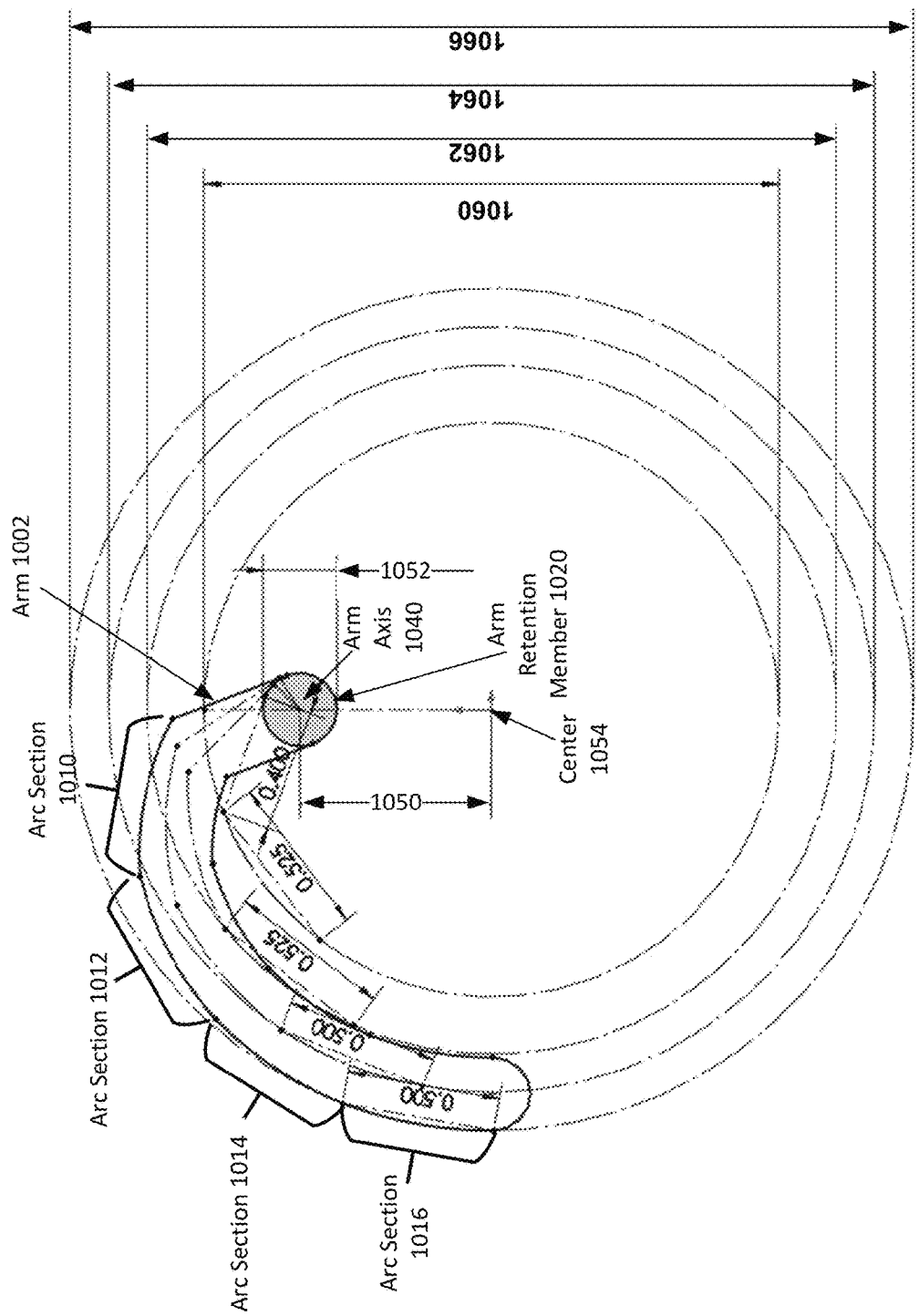
FIG. 10C depicts the dimensions of an arm according to some embodiments.

FIG. 10C depicts dimensions of the arm 1002 according to some embodiments. While the arm 1002 can include any number of arc sections with any number of lengths, FIG. 10C shows one example of four arc sections 1010, 1012, 1014, and 1016. In this example, a distance 1050 between a center 1054 of a diameter (e.g., a center of the base component 600 depicted in FIG. 6A) and a center of the arm retention member 1020 is 0.625 inches. The multiple arm coupling components may be disposed in a circular spiral, such that the separation between the center 1054 of the base component and the arm coupling component of each of the arms of the radial expansion device 800 (see FIG. 8) is 0.625 inches. In various embodiments, a diameter 1052 of the arm retention member 1020 is 0.24 inches.

In one example, when the radial expansion device 800 (see FIG. 8) is in a closed state or has a 0 inch offset from a diameter. In this example, the circular spiral formed by the arc section 1010 may have a diameter 1060. The diameter 1060 is 1.875 inches. The arc section 1010 may include a chord length of 0.525 inches.

In a first offset position, in this example, the radial expansion device 800 has an ⅛ inch offset. The circular spiral formed in part by the arc section 1012 may have a diameter 1062 (e.g., an ⅛ inch offset from the diameter 250 of the rolling pin body 110 in FIG. 2A may result in a diameter change of 0.25 inch). In some embodiments, the chord 1072 is 2.250 inches. In an example, the difference between the diameter 250 of the rolling pin body 110 of FIG. 2A and the diameter of the first offset position is greater than 0.25 because protective layers which surround the radial expansion device 130A add to the diameter 1062. The arc section 1012 may include a chord length of 0.525 inches.

In various embodiments, in a second offset position, the radial expansion device 800 has an ¼ inch offset. The circular spiral formed in part by the arc section 1014 may have a diameter 1064 (e.g., an ¼ inch offset from the diameter 250 of the rolling pin body 110 in FIG. 2A may result in a diameter change of 0.5 inches). In some embodiments, the diameter 1064 is 2.5 inches. The difference between the diameter 1064 of the second offset position and the diameter 1062 of the first offset position is 0.5 inches. The arc section 1014 may include a chord length of 0.5 inches.

When the radial expansion device 800 is in a third offset position or has a ⅜ inch offset, the circular spiral formed in part by the arc section 1016 may have a diameter 1066 (e.g., a ⅜ inch offset from the diameter 250 of the rolling pin body 110 in FIG. 2A results in a diameter change of 0.75 inches). In some embodiments, the diameter 1066 is 2.75 inches. The difference between the diameter 1066 of the third offset position and the diameter 1064 of the second offset position is 0.5 inches. The arc section 1016 may include a chord length of 0.5 inch.

Figure 10D:
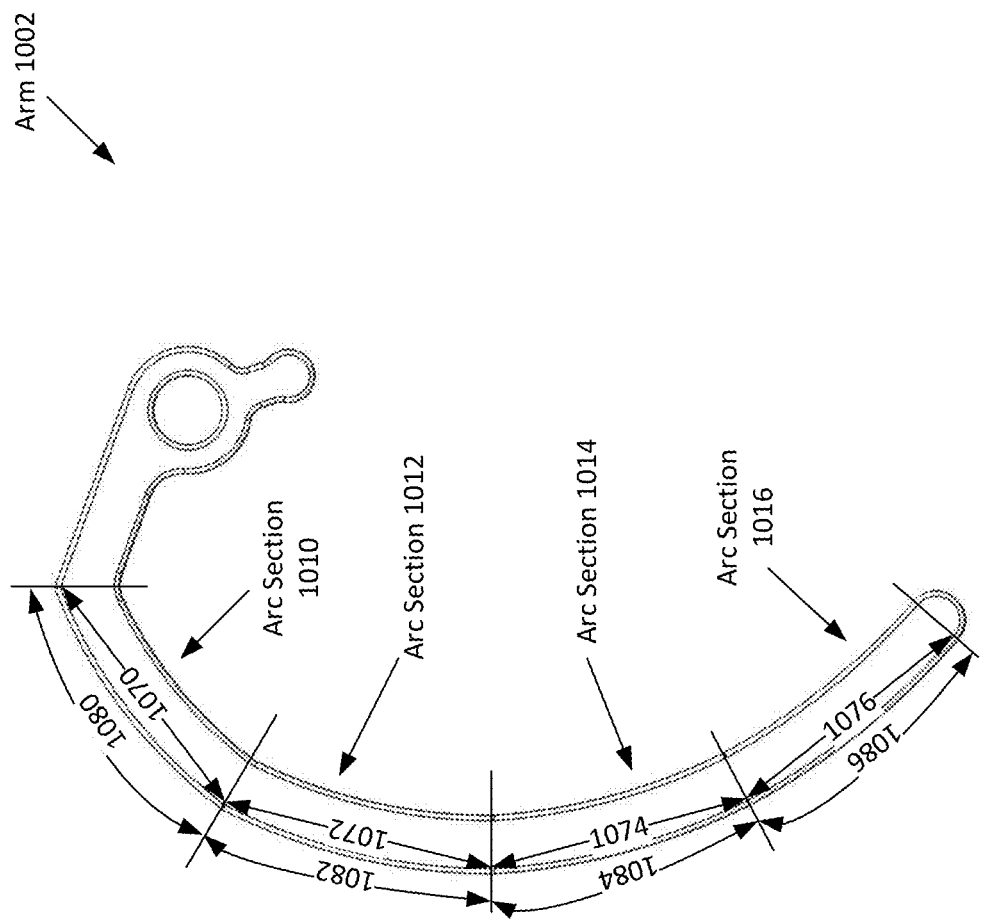
FIG. 10D depicts dimensions of an arm according to some embodiments.

FIG. 10D depicts dimensions of the arm 1002 according to some embodiments. In this example, the arc section 1010 has an arc length 1080 of 0.117 inches, the length of an arc section (e.g., arc section 1010) is the diameter of the circular spiral divided by the number of arms 1000 in the radial expansion device 800. The arc section 1010 has a chord 1070. The chord 1070 has a length of 0.525 inches in this example. The arc section 1012 includes a chord 1072 and an arc length 1082. The chord 1072 is 0.525 inches, and the adjustment angle 1092 is 0.140 inches. The arc section 1014 includes a chord 1074 and an arc length 1084. The chord 1074 is 0.5 inches, and the adjustment angle 1094 is 0.156 inches. The arc section 1016 include a chord 1076 and an arc length 1086. The chord 1076 is 0.5 inches, and the adjustment angle 1096 is 0.172 inches.

The measurements depicted in FIG. 10D may be utilized in conjunction with the radial expansion device 130A depicted in FIG. 1 for use with the rolling pin system 100. It will be appreciated that an arm 1002 may have different lengths, different chords, and different arc sections than that depicted in FIG. 10D.

Figure 10E:
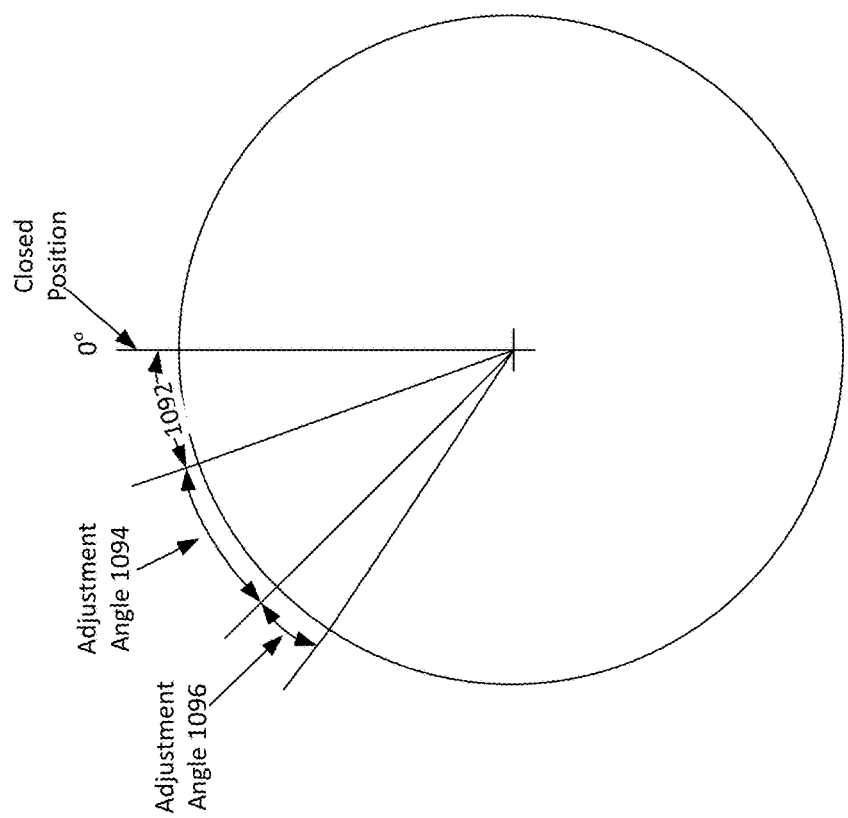
FIG. 10E depicts rotational angles of radial expansion device according to some embodiments.

FIG. 10E depicts rotational angles of the radial expansion device 800 according to some embodiments. In the closed state in this example, the arm 1002 may have a rotational angle of 0° on the arm axis 1040. By rotating the gear spline (e.g., gear spline 840 of FIG. 8), the arm 1002 may have an adjustment angle 1092 and the arms of the radial expansion device 800 may form a circular spiral that expands a diameter. This may be accomplished by forming a circular spiral of arc sections of arms that has a ⅛ inch offset from the original diameter. In some embodiments, the adjustment angle 1092 is 20.26°.

By rotating, the arm 1002 may have an adjustment angle 1094. The arms of the radial expansion device may form a circular spiral with an offset of a ¼ inch. This may be accomplished by forming a circular spiral that has an ¼ inch offset from the original diameter. In some embodiments, the adjustment angle 1094 is 23.81°.

By rotating, the arm 1002 may have an adjustment angle 1096. The arms of the radial expansion device may form a circular spiral with an offset of ⅜ inch. This may be accomplished by forming a circular spiral that has a ⅜ inch offset from the original diameter. In some embodiments, the adjustment angle 1096 is 13.06°.

Figure 11A:
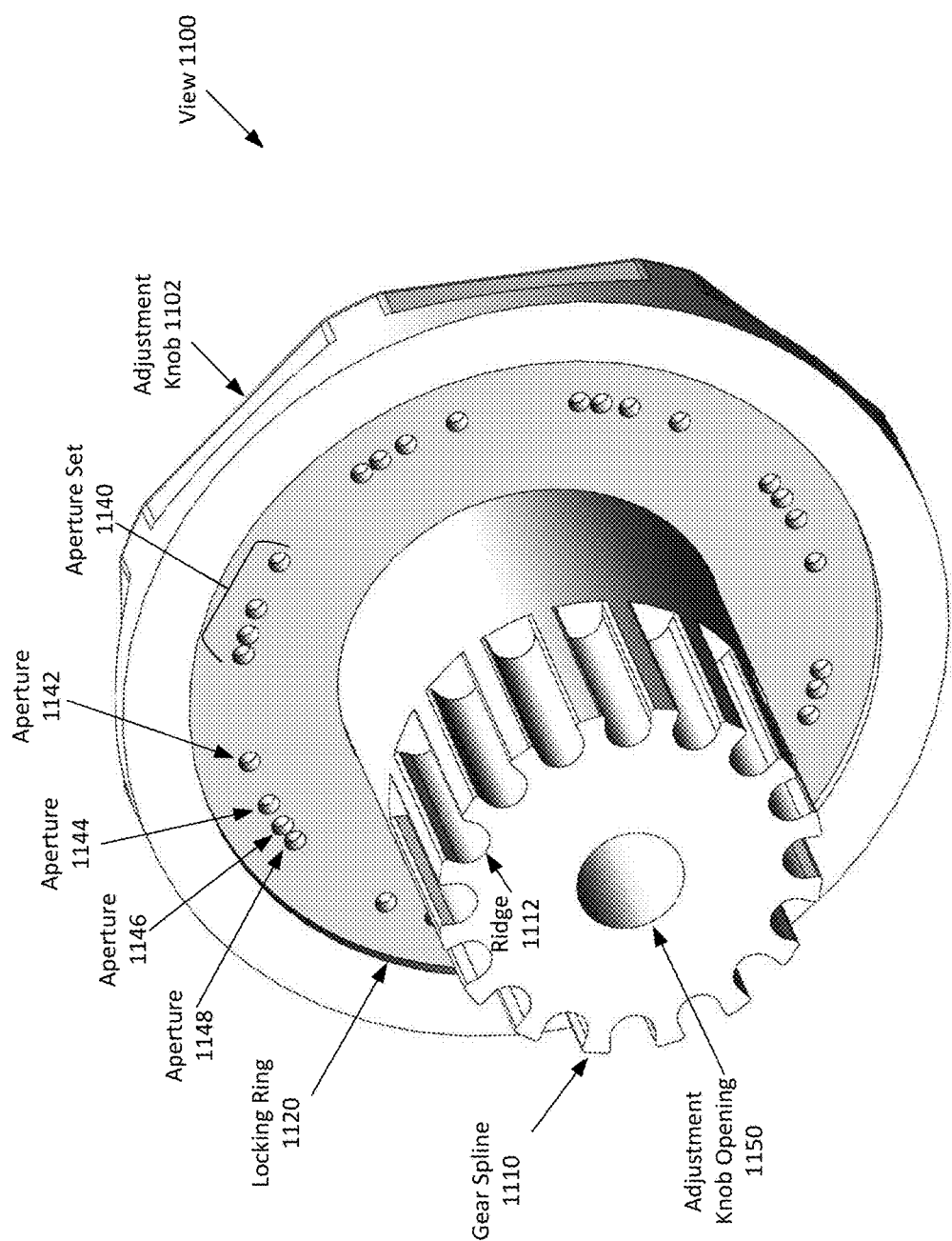
FIG. 11A depicts a perspective view of an adjustment knob according to some embodiments.

FIG. 11A depicts a perspective view 1100 of an adjustment knob 1102 according to some embodiments. The adjustment knob 1102 is coupled to a locking ring 1120 and a gear spline 1110. In one example, the gear spline 1110 is gear spline 840 of FIG. 8.

The gear spline 1110 may be coupled to or a protrusion of the adjustment knob 1102. The gear spline 1110 includes multiple ridges such as ridge 1112, which mechanically interface with pivot components (such as pivot component 1030 of FIG. 10A) on each of the arms 450 of the radial expansion device (such as radial expansion device 130A or 130B coupled to a rolling pin system 100 as show in FIG. 1). In some embodiments, the gear spline 1110 includes the same number of ridges as the number of arms of the radial expansion device. Typically, the gear spline 1110 is rotated when a user turns the adjustment knob 1102. The degree to which the user turns the adjustment knob 1102 determines the offset position of the radial expansion device. By turning the adjustment knob 1102, the ridges (e.g., including ridge 1112) of the gear spline 1110 rotates. Looking back to FIG. 9, as the gear spline 1110 rotates, the pivot components of each arm, which are mechanically interfaced with the ridges of the gear spline 840 also turn, causing different arc sections of the arms (e.g., including arm 820) to form circular spirals and expand or retract a diameter depending on the circular spiral of arc sections.

The locking ring 1120 is coupled to the adjustment knob 1102 on the side facing the gear spline 1110. In this example, the locking ring 1120 is within a cavity of the adjustment knob 1102. The locking ring 1120 includes apertures 1142, 1144, 1146, and 1148 which can be arranged in aperture sets (e.g., aperture set 1140). In some embodiments, a ball detent may interface the adjustment knob 1102 with an aperture (e.g., aperture 1142) to assist in setting the position of the gear spline 1110 thereby defining a setting of the radial expansion device (e.g., setting the diameter of the circular spiral of arc sections of arms).

The ball detent positions one mechanical component relative to another. In this case, the ball detent holds the arms of the radial expansion device (e.g., arms 450 of the radial expansion device 130A of FIG. 4B) in a particular position (e.g., an open state 242A of FIG. 4B) based on a rotational angle of the adjustment knob 1102. For example, in a closed state 240A (see FIG. 4A), the adjustment knob 1102 interface ball detent positions with any number of the apertures 1142, 1144, 1146, and 1148 and hold each of the arms 450 (see FIG. 4A) in the closed state 240A.

In some embodiments, the locking ring 1120 is composed of stainless steel. Alternatively, the locking ring 1120 is composed of non-reactive metals or a polymer.

It will be appreciated that that the adjustment knob 1102 and locking ring 1120 are one of many ways to actuate or control the opening or closing of the arms. It will be appreciated that any actuator may be utilized (e.g., the actuator is not limited to the adjustment knob 1102, locking ring 1120, and gear spline 1110).

From the closed state 240A, the user may interact with or rotate the adjustment knob 1102 by an adjustment angle 1092, to a first offset position, which turns the arms 450 of the radial expansion device 130A such that a first arc section 1010 (see FIG. 10A) of each of the arms 450 form a circular spiral with a first offset from a first diameter.

From a position corresponding to the adjustment angle 1092, or the first offset position, the user may rotate the adjustment knob 1102 by the adjustment angle 1094 to a second offset position such that a second arc section 1012 of each of the arms 450 form a circular spiral with a second offset from a second diameter (the second offset being larger than the first offset and, as a result, the second diameter is larger than the first diameter).

From a position corresponding to the adjustment angle 1094, or the second offset position, the user may rotate the adjustment knob 1102 by the adjustment angle 1096 to a third offset position such that a third arc section 1014 of each of the arms 450 form a circular spiral with a third offset from a third diameter (the third offset being larger than the first and second offsets and, as a result, the third diameter is larger than the second diameter and the first diameter).

The apertures 1142, 1144, 1146, and 1148 (as well as the other apertures not numbered in FIG. 11A) may lock the position of the gear spline 1110. As a result, the ridges of the gear spline 1110 lock the arms 450 in position to set the position of the multiple arms 450 to form a continuous, or substantially continuous, circular spiral that does not slide open or closed without the user's intention. In some embodiments, the user may start at the closed state 240A and rotate to the second offset position (e.g., open state 242A) without stopping at the first offset position (e.g., mid-state 244A).

Typically, the gear spline 1110 and adjustment knob 1102 are composed of any rigid material (e.g., stainless steel or plastic). In some embodiments, the gear spline 1110 and adjustment knob 1102 are composed of non-reactive metals or a polymer.

The gear spline 1110 and the locking ring 1120 may include a cavity that forms an adjustment knob opening 1150. A support member (now shown) may be coupled to the adjustment knob 1102 may engage with a body maintaining the ball detents.

Figure 11B:
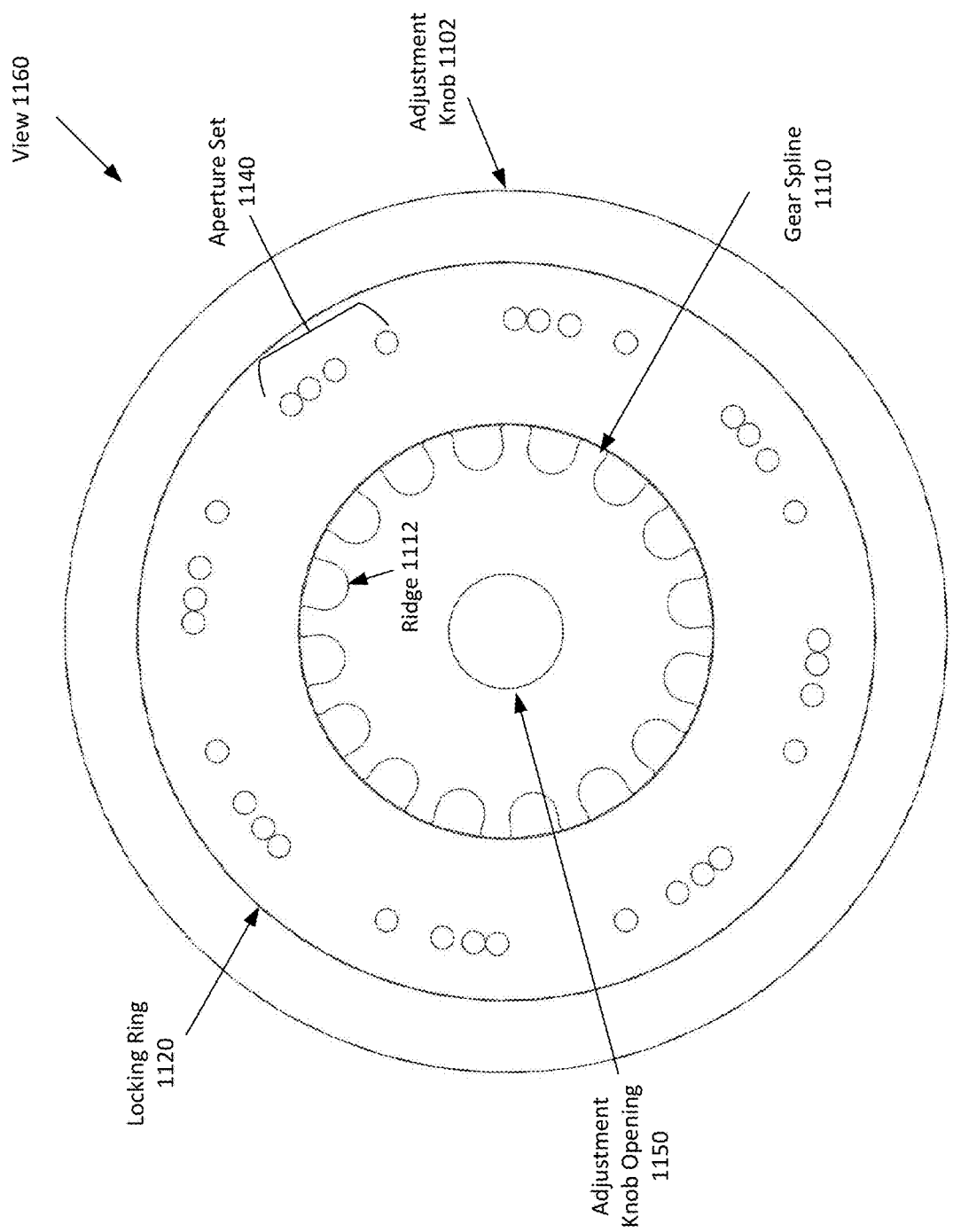
FIG. 11B depicts a back view of an adjustment knob, locking ring, and gear spline according to some embodiments.

FIG. 11B depicts a back view 1160 of an adjustment knob 1102, locking ring 1120, and gear spline 1110 according to some embodiments. The back view 1160 further includes the aperture set 1140 and the adjustment knob opening 1150. In some embodiments, the adjustment knob 1102 may have a transparent or semi-transparent window to allow an individual to view the components of the radial expansion device.

Figure 12:
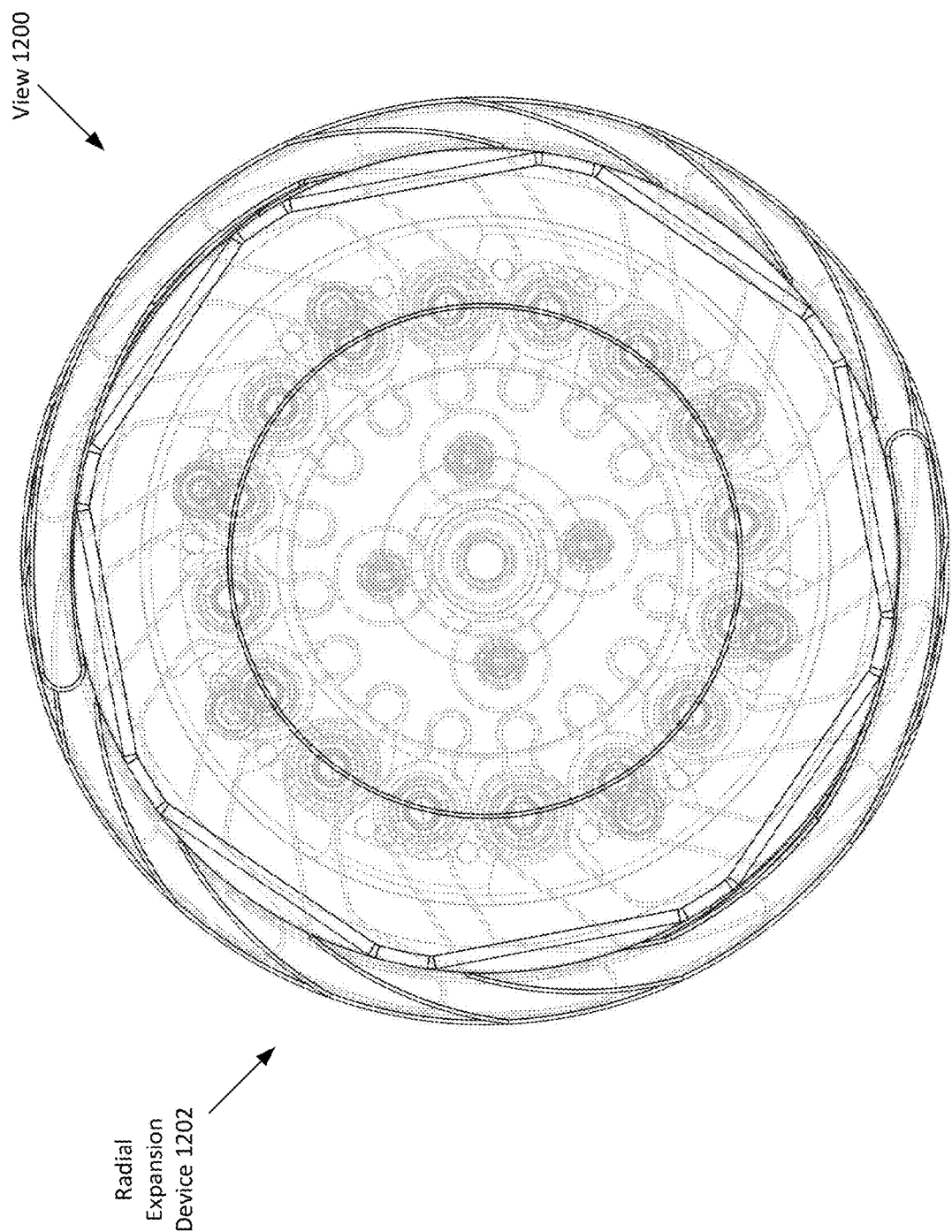
FIG. 12 depicts a view of the radial expansion device showing parts of the adjustment knob, locking ring, and arms according to some embodiments.

FIG. 12 depicts a view 1200 of the radial expansion device 1202 showing parts of the adjustment knob 1102, locking ring 1120, and arms 450 according to some embodiments. The view 1200 includes outlines of all the arms 450 coupled to the arm coupling components 708 (see FIG. 7). The adjustment knob 1102 turns the gear spline 1110 thereby causing the arms 450 to turn or rotate about their respective arm coupling components. It will be appreciated that, in some embodiments, the gear spline 1110 is stationary and the arms 450 are moved thereby causing the arms 450 to turn outwards or inwards due to the interface with the gear spline 1110.

Figure 13:
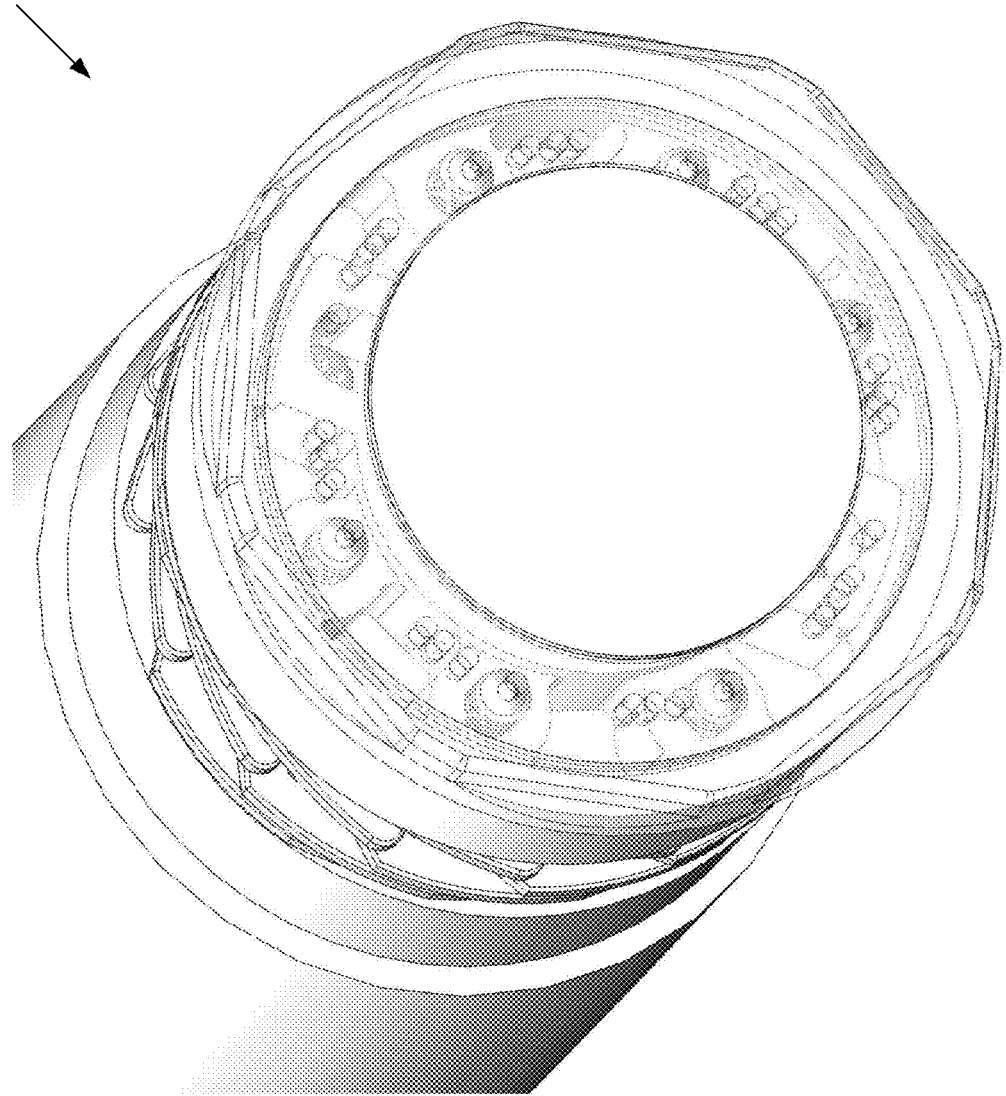
FIG. 13 depicts a perspective view of components of the radial expansion device of the rolling pin system according to some embodiments.

FIG. 13 depicts a perspective view 1300 of components of the radial expansion device 1202 of the rolling pin system 100 according to some embodiments. The components of the radial expansion device 1202 are seen through the end of the rolling pin system 100.

Figure 14A:
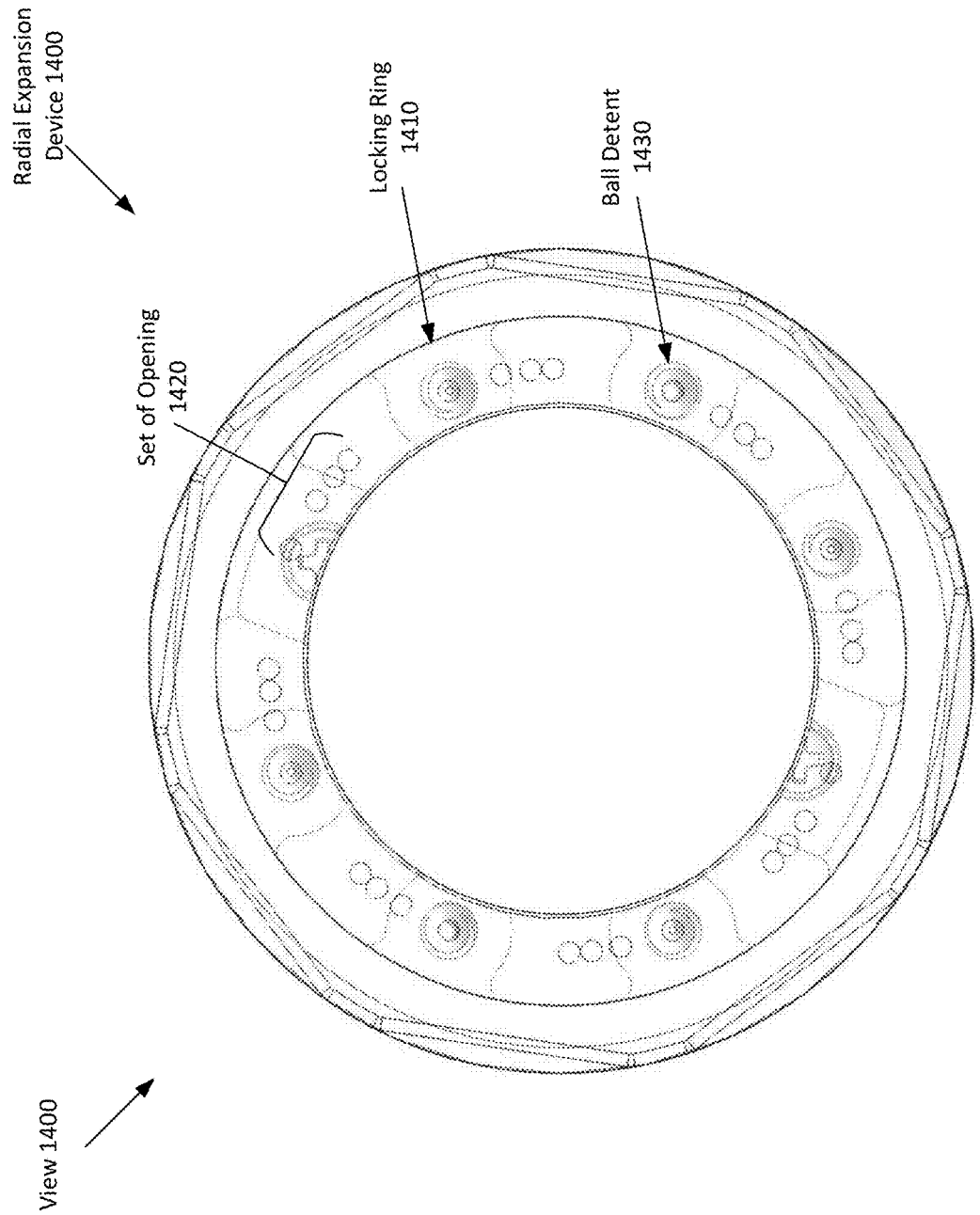
FIG. 14A depicts a view of components of a radial expansion device of the rolling pin system in which arms of the radial expansion device are in a closed state according to some embodiments.

FIG. 14A depicts a view of components of a radial expansion device 1400 of the rolling pin system 100 in which arms 450 of the radial expansion device 1400 are in a closed state according to some embodiments. In the closed state, the arms may not be visible. The side view of the radial expansion device 1400 may depict a part of an index ring, a locking ring 1410 as well as multiple sets of arm coupling components, including a set of arm coupling components 1420. The radial expansion device 1400 further includes a ball detent 1430. The ball detent 1430 holds the arms of the radial expansion device 1400 in a particular position based on a rotational angle of an adjustment handle of the radial expansion device 1400.

Figure 14B:
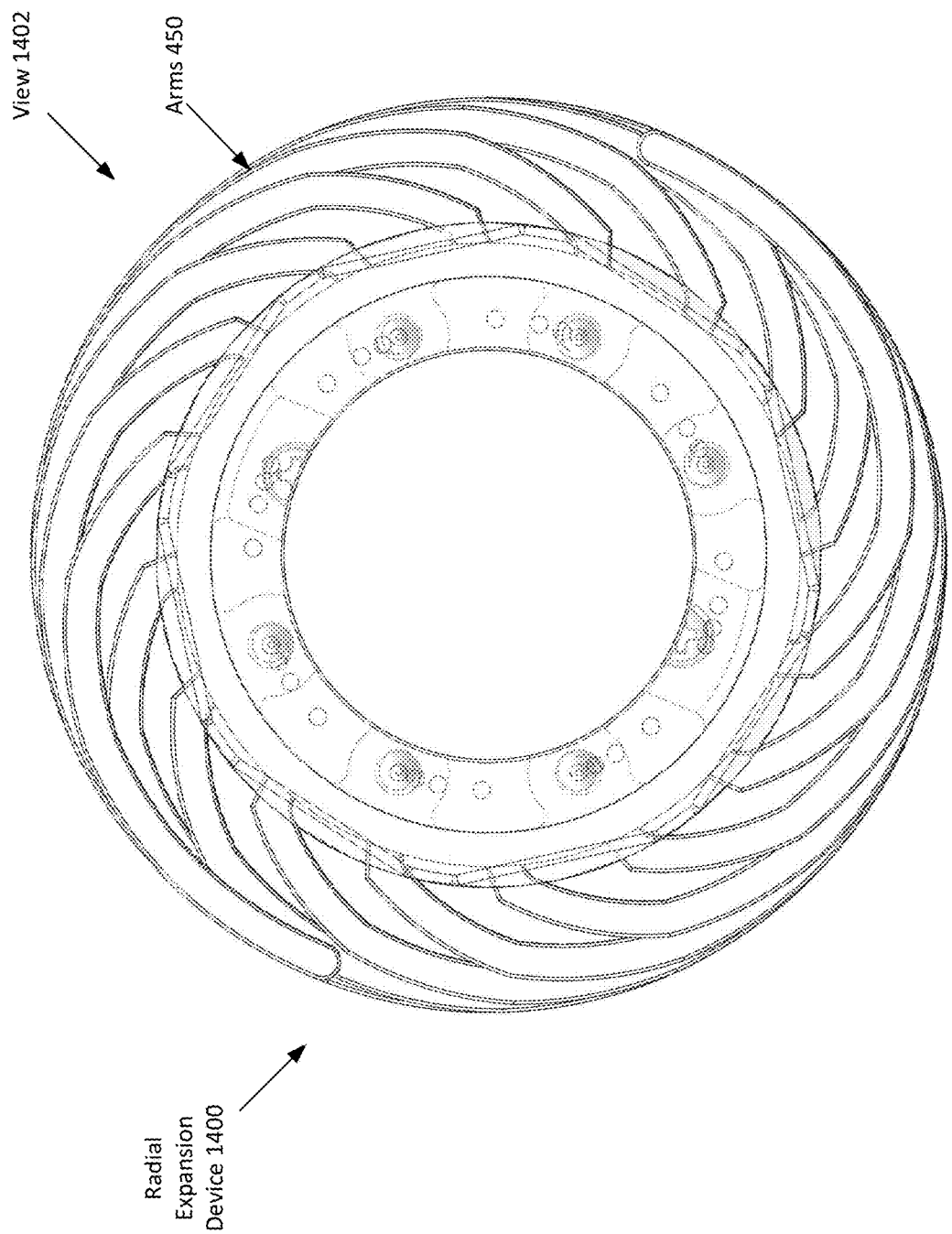
FIG. 14B depicts another view of components of the radial expansion device in which arms are in an open state according to some embodiments.

FIG. 14B depicts another view 1402 of components of the radial expansion device 1400 in which arms 450 are in an open state (e.g., open state 242A) according to some embodiments.

Figure 14C:
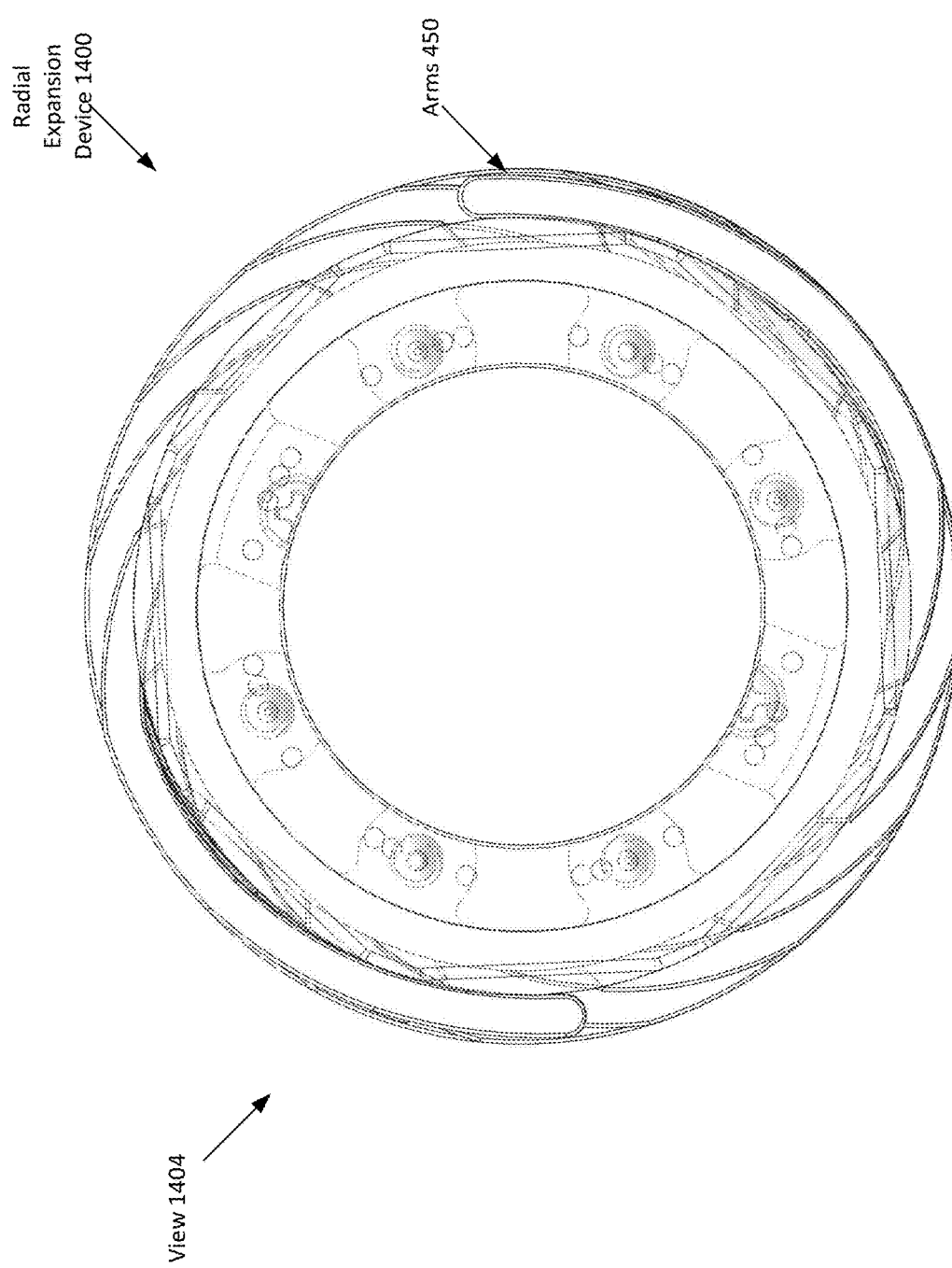
FIG. 14C depicts a view of components of the radial expansion device in which arms are in a closed state according to some embodiments.

FIG. 14C depicts a view 1404 of components of the radial expansion device 1400 in which arms 450 are in a closed state (e.g., closed state 240A) according to some embodiments.

Figure 15:
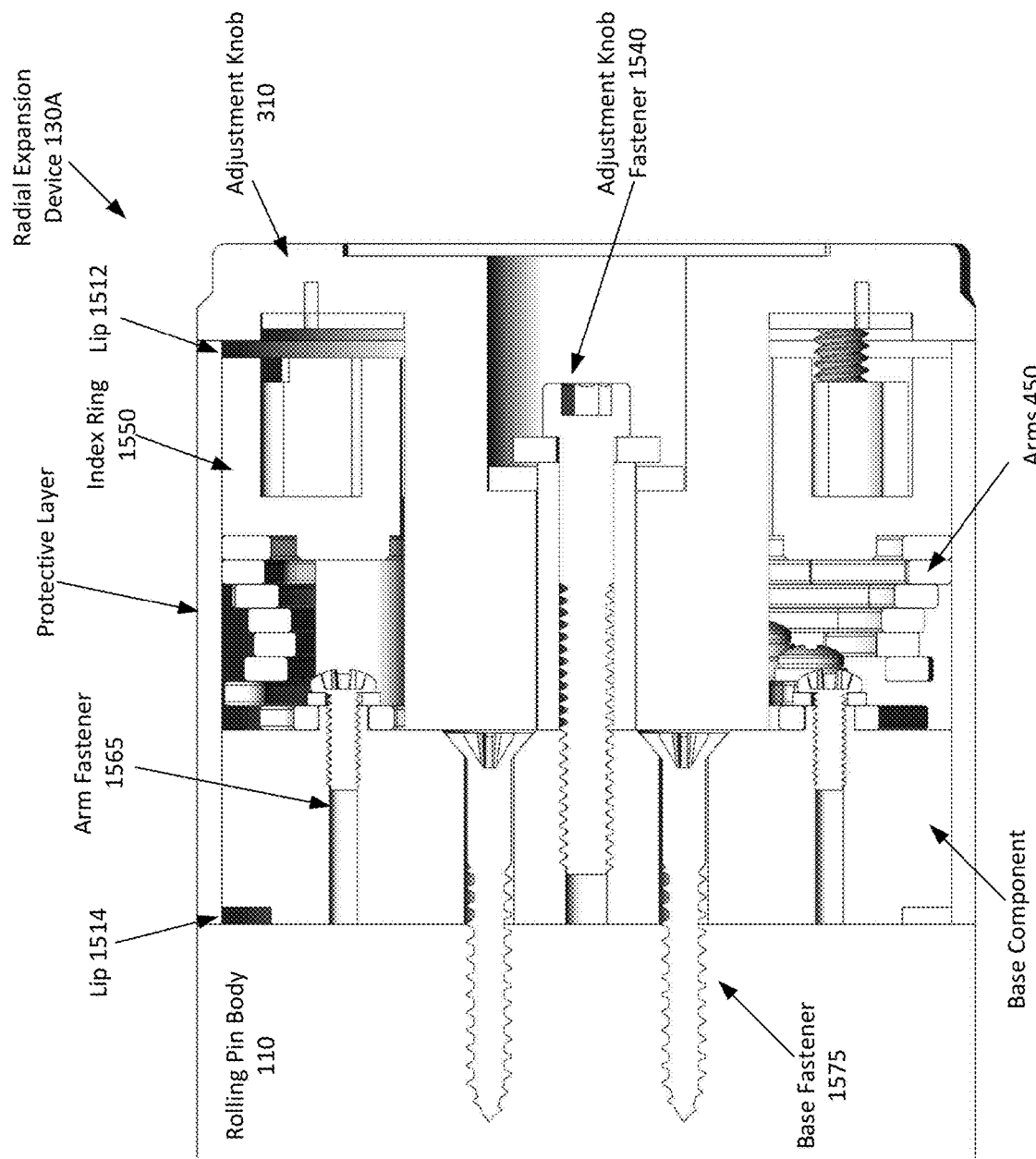
FIG. 15 depicts a cross-sectional view of the body of a radial expansion device coupled to the rolling pin body according to some embodiments.

FIG. 15 depicts a cross-sectional view of a radial expansion device 130A coupled to the rolling pin body 110 according to some embodiments. While FIGS. 6A, 6B, 6C, 7, 8, 9, 10A, 10B, 10C, 10D, 10E, 11A, and 11B may refer to any radial expansion device used with different devices, the example radial expansion device 130A in FIG. 15 refers to the implementation with the rolling pin body 110 of FIG. 1.

The radial expansion device 130A includes a protective layer 170A, which protects the components of the radial expansion device 130A from flour, water, dust, and dough. Indentations or lips 1512 and 1514 in the radial expansion device 130A include gaskets or other rubber members that are compressed and form a seal with the protective layer 170A.

The radial expansion device 130A includes an adjustment knob 310. An adjustment knob fastener 1540 may couple the adjustment knob 310 to the rolling pin body. The adjustment knob fastener 1540 typically includes a stainless-steel socket head cap screw. Alternatively, the adjustment knob fastener 1540 may be composed of polymer, wood, brass, copper, or a non-reactive metal. In some embodiments, the adjustment knob fastener 1540 further couples an index ring 1550 to the rolling pin body 110. Each of the multiple arms 450 of the radial expansion device 130A may be coupled to the rolling pin body 110 using an arm fastener 1565. Typically, the arm fastener 1565 is a stainless-steel screw but may be any fastener. A base component 600 of the radial expansion device 130A may be coupled to the rolling pin body 110 using base fasteners (including base fastener 1575). It will be appreciated that the radial expansion device 130A may be coupled to the rolling pin body 110 in any number of ways (e.g., fasteners, glue, and/or the like).

The invention claimed is:
1. A rolling pin system comprising:
a rolling pin with a first end, a second end, and a rolling pin diameter;
a first radial expansion device coupled to the first end, the first radial expansion device having a first modifiable diameter, the first radial expansion device having a plurality of first arms, each first arm of the plurality of first arms including a first pivot component configured to pivot from a first state to a second state, each first arm including a first arc section and a second arc section, the first arc section having a first diameter of curvature, the second arc section having a second diameter of curvature different than the first diameter of curvature, the first arc sections of the plurality of first arms cooperating to form a first surface of rotation when the first pivot components of the plurality of first arms are in the first state, the second arc sections of the plurality of first arms cooperating to form a second surface of rotation when the first pivot components of the plurality of first arms are in the second state, the second diameter of curvature being greater than the rolling pin diameter, the first surface of rotation being a circular spiral of the first arc sections of the plurality of first arms; and a second radial expansion device coupled to the second end, the second radial expansion device having a second modifiable diameter, the second radial expansion device having a plurality of second arms, each second arm of the plurality of second arms including a second pivot component configured to pivot from a third state to a fourth state, each second arm including a third arc section and a fourth arc section, the third arc section having the first diameter of curvature, the fourth arc section having the second diameter of curvature, the third arc sections of the plurality of second arms cooperating to form the first surface of rotation when the second pivot components of the plurality of second arms are in the third state, the fourth arc sections of the plurality of second arms cooperating to form the second surface of rotation when the second pivot components of the plurality of second arms are in the fourth state.

2. The rolling pin of claim 1, wherein each first pivot component of the plurality of first arms is coupled to a first actuation device configured to pivot from the first state to the second state and each second pivot component of the plurality of second arms is coupled to a second actuation device configured to pivot from the third state to the fourth state.

3. The rolling pin of claim 1, wherein each first arm of the plurality of first arms is at least partially adjacent to at least one other arm of the plurality of first arms and each second arm of the plurality of second arms is at least partially adjacent to at least one other arm of the plurality of second arms.

4. The rolling pin of claim 1, wherein the second surface of rotation is a circular spiral of the second arc sections of the plurality of first arms.

5. The rolling pin of claim 1, wherein the first state comprises the first arc sections of the plurality of first arms being at a first outer circumference of the first radial expansion device and wherein the second state comprises the second arc sections of the plurality of first arms being at a second outer circumference of the first radial expansion device.

6. The rolling pin of claim 1, further comprising an elastic material that is stretchable when the second arc sections of the plurality of first arms cooperate to form the second surface of rotation.

7. The rolling pin of claim 1, wherein the first diameter of curvature is greater than the rolling pin diameter.

8. A rolling pin system comprising:
a rolling pin with a first end, a second end, and a rolling pin diameter;
a first radial expansion device coupled to the first end, the first radial expansion device having a first modifiable diameter, the first radial expansion device having a plurality of first arms, each first arm of the plurality of first arms including a first pivot component configured to pivot from a first state to a second state, each first arm including a first arc section and a second arc section, the first arc section having a first diameter of curvature, the second arc section having a second diameter of curvature different than the first diameter of curvature, the first arc sections of the plurality of first arms cooperating to form a first surface of rotation when the first pivot components of the plurality of first arms are in the first state, the second arc sections of the plurality of first arms cooperating to form a second surface of rotation when the first pivot components of the plurality of first arms are in the second state, the second diameter of curvature being greater than the rolling pin diameter, the first state comprising the first arc sections of the plurality of first arms being at a first outer circumference of the first radial expansion device and wherein the second state comprises the second arc sections of the plurality of first arms being at a second outer circumference of the first radial expansion device; and a second radial expansion device coupled to the second end, the second radial expansion device having a second modifiable diameter, the second radial expansion device having a plurality of second arms, each second arm of the plurality of second arms including a second pivot component configured to pivot from a third state to a fourth state, each second arm including a third arc section and a fourth arc section, the third arc section having the first diameter of curvature, the fourth arc section having the second diameter of curvature, the third arc sections of the plurality of second arms cooperating to form the first surface of rotation when the second pivot components of the plurality of second arms are in the third state, the fourth arc sections of the plurality of second arms cooperating to form the second surface of rotation when the second pivot components of the plurality of second arms are in the fourth state.

9. The rolling pin of claim 8, wherein each first pivot component of the plurality of first arms is coupled to a first actuation device configured to pivot from the first state to the second state and each second pivot component of the plurality of second arms is coupled to a second actuation device configured to pivot from the third state to the fourth state.

10. The rolling pin of claim 8, wherein each first arm of the plurality of first arms is at least partially adjacent to at least one other arm of the plurality of first arms and each second arm of the plurality of second arms is at least partially adjacent to at least one other arm of the plurality of second arms.

11. The rolling pin of claim 8, wherein the first surface of rotation is a circular spiral of the first arc sections of the plurality of first arms.

12. The rolling pin of claim 8, wherein the second surface of rotation is a circular spiral of the second arc sections of the plurality of first arms.

13. The rolling pin of claim 8, further comprising an elastic material that is stretchable when the second arc sections of the plurality of first arms cooperate to form the second surface of rotation.

14. The rolling pin of claim 8, wherein the first diameter of curvature is greater than the rolling pin diameter.

* * * * *